(12) United States Patent
Ames et al.

(10) Patent No.: US 9,003,294 B1
(45) Date of Patent: Apr. 7, 2015

(54) SCALABLE SYSTEMS FOR CHANGE DETECTION OF STATISTIC DATA FEEDS ACROSS MULTIPLE SERVERS USING SHARED MEMORY WITH CONFIGURABLE MESSAGING TRIGGERS

(71) Applicant: FanActivate, LLC, Los Angeles, CA (US)

(72) Inventors: Craig Ames, Los Angeles, CA (US); Robert E. McGee, Jr., San Clemente, CA (US); Christian Candia White, Santiago (CL)

(73) Assignee: FanActivate, LLC, Los Angeles, CA (US)

( * ) Notice: Subject to any disclaimer, the term of this patent is extended or adjusted under 35 U.S.C. 154(b) by 0 days.

(21) Appl. No.: 14/582,119

(22) Filed: Dec. 23, 2014

(51) Int. Cl.
  *G06F 3/048* (2013.01)
  *H04L 29/08* (2006.01)
  *G06F 3/0482* (2013.01)
  *H04L 29/06* (2006.01)

(52) U.S. Cl.
  CPC .............. *H04L 67/10* (2013.01); *G06F 3/0482* (2013.01); *H04L 65/403* (2013.01); *H04L 67/26* (2013.01)

(58) Field of Classification Search
  USPC .......................................................... 715/739
  See application file for complete search history.

(56) References Cited

U.S. PATENT DOCUMENTS

| | | | |
|---|---|---|---|
| 6,928,413 | B1 | 8/2005 | Pulitzer |
| 8,296,794 | B2 | 10/2012 | Hughes et al. |
| 8,364,540 | B2 | 1/2013 | Soroca et al. |
| 8,505,045 | B2 | 8/2013 | Hughes et al. |
| 2006/0026067 | A1 | 2/2006 | Nicholas et al. |
| 2006/0155659 | A1 | 7/2006 | DiCesare |
| 2010/0179867 | A1 | 7/2010 | Hughes et al. |
| 2010/0210331 | A1 | 8/2010 | Hughes et al. |
| 2010/0211465 | A1 | 8/2010 | Hughes et al. |
| 2012/0210348 | A1 | 8/2012 | Verna et al. |
| 2012/0244949 | A1 | 9/2012 | Redling |
| 2013/0060876 | A1 | 3/2013 | Janas |
| 2013/0198772 | A1 | 8/2013 | Wang et al. |
| 2014/0011587 | A1 | 1/2014 | Hughes et al. |
| 2014/0033288 | A1 | 1/2014 | Wynn et al. |

(Continued)

FOREIGN PATENT DOCUMENTS

WO 0152149 A2 7/2001

OTHER PUBLICATIONS

SMS Marketing and Marketing Automation Software—Trumpia, downloaded from http://trumpia.com (3 pages).

(Continued)

*Primary Examiner* — Peiyong Weng
(74) *Attorney, Agent, or Firm* — Knobbe, Martens, Olson & Bear LLP

(57) ABSTRACT

Various computerized systems and methods are provided for creating sports statistic triggers, and analyzing sporting statistic feeds and determination, bashed on updates to sporting statistic feeds, whether or not a trigger has been satisfied. Sports statistic triggers for sporting events may be created using a user interface and stored, along with associated parameters, in data storage. Live downloaded sports statistic data feeds can be analyzed by a plurality of processes to determine whether or not one or more sport statistic triggers have been satisfied. Based on satisfaction of one or more sport statistic trigger, a broadcast message may be delivered to subscribers using a variety of delivery methods according to a distribution list.

20 Claims, 37 Drawing Sheets

(56) References Cited

U.S. PATENT DOCUMENTS

2014/0156752 A1 6/2014 Fetyko
2014/0180822 A1 6/2014 Peebles et al.

OTHER PUBLICATIONS

Phizzle, downloaded from http://www.phizzle.com (2 pages).
TheScore App: The Ultimate, Personalized Mobile Sports Experience, downloaded from http://mobile.thescore.com (4 pages).
Lakers Text Messages, Lakers Text Alerts, Los Angeles Lakers, printed from http://www.nba.com/lakers/multimedia/lakers_text_messages in 2 pages (printed on Jan. 19, 2015).
Lakers TXT2WIN Sweepstakes, Verizon Txt2Win, The Official Site of the Los Angeles Lakers, printed from http://www.nba.com/lakers/promotions/1314verizon_txt2win in 2 pages (printed on Jan. 19, 2015).
Rev Rocket, LLLC, printed from http://www.revrocket.us/ in 3 pages (printed on Jan. 19, 2015).
Wingstop, 90105Connects > Welcome to Wingstop!, printed from http://90105connects.recrocket.us/b/wingstop-149005 in 2 pages (printed on Jan. 19, 2015).
2sms Enterprise Text Messaging, Business Solution Alliance, Verizon, printed from http:/2sms.com/in 3 pages (printed on Jan. 19, 2015).
Wingstop Text Program, Wingstop Text Program, Los Angeles Lakers, printed from http://www.nba.com/lakers/promotion/1415_wingstop in 3 pages (printed on Feb. 2, 2015).

```
1   <league sport="NFL" sport_id="4">
2       <realtime>
3           <feeds refresh="30">
4               <feed url="
                    ████████████████/getfeed/XXXXXXXXXXXXXXXXXXXXXXXXX
                    /football/nfl-scores" />
5           </feeds>
6           <event name="Match" src="scores.category.match" index=
            "contestID" channel="consoleJSON,liveMatch,match">
7               <attribute name="status" type="string">
8                   <string string="Not Started" value="Future"/>
9                   <string string="Final" value="Final"/>
10                  <string string="Postponed" value="Post" />
11                  <string string="*" value="Activ"/>
12              </attribute>
13              <attribute name="hometeam.totalscore" type="int" />
14              <attribute name="awayteam.totalscore" type="int" />
15              <attribute name="contestID" type="int" propagate="true"/>
16          </event>
17          <event name="HomeTeamPassing" src=
            "scores.category.match.passing.hometeam.player" index="id"
            channel="livePlayer,consoleJSON" >
18              <attribute name="name" type="string"/>
19              <attribute name="yards" type="int"/>
20              <attribute name="comp_att" type="int"/>
21              <attribute name="average" type="int"/>
22              <attribute name="passing_touch_downs" type="int"/>
23              <attribute name="interceptions" type="int"/>
24              <attribute name="two_pt" type="int"/>
25              <attribute name="id" type="int"/>
26              <attribute name="match_team" type="string" value=
                "hometeam" />
27          </event>
28          <event name="AwayTeamPassing" src=
            "scores.category.match.passing.awayteam.player" index="id"
            channel="livePlayer,consoleJSON" >
29              <attribute name="name" type="string"/>
30              <attribute name="yards" type="int"/>
31              <attribute name="comp_att" type="int"/>
32              <attribute name="average" type="int"/>
33              <attribute name="passing_touch_downs" type="int"/>
34              <attribute name="interceptions" type="int"/>
35              <attribute name="two_pt" type="int"/>
36              <attribute name="id" type="int"/>
37              <attribute name="match_team" type="string" value=
                "awayteam" />
```

FIG. 2A

```
38          </event>
39          <event name="HomeTeamRushing" src=
            "scores.category.match.rushing.hometeam.player" index="id"
            channel="livePlayer,consoleJSON" >
40              <attribute name="name" type="string"/>
41              <attribute name="yards" type="int"/>
42              <attribute name="total_rushes" type="int"/>
43              <attribute name="average" type="int"/>
44              <attribute name="rushing_touch_downs" type="int"/>
45              <attribute name="longest_rush" type="int"/>
46              <attribute name="two_pt" type="int"/>
47              <attribute name="id" type="int"/>
48              <attribute name="match_team" type="string" value=
                "hometeam" />
49          </event>
50          <event name="AwayTeamRushing" src=
            "scores.category.match.rushing.awayteam.player" index="id"
            channel="livePlayer,consoleJSON" >
51              <attribute name="name" type="string"/>
52              <attribute name="yards" type="int"/>
53              <attribute name="total_rushes" type="int"/>
54              <attribute name="average" type="int"/>
55              <attribute name="rushing_touch_downs" type="int"/>
56              <attribute name="longest_rush" type="int"/>
57              <attribute name="two_pt" type="int"/>
58              <attribute name="id" type="int"/>
59              <attribute name="match_team" type="string" value=
                "awayteam" />
60          </event>
61          <event name="HomeTeamReceiving" src=
            "scores.category.match.receiving.hometeam.player" index="id"
            channel="livePlayer,consoleJSON" >
62              <attribute name="name" type="string"/>
63              <attribute name="yards" type="int"/>
64              <attribute name="total_receptions" type="int"/>
65              <attribute name="average" type="int"/>
66              <attribute name="receiving_touch_downs" type="int"/>
67              <attribute name="longest_reception" type="int"/>
68              <attribute name="two_pt" type="int"/>
69              <attribute name="id" type="int"/>
70              <attribute name="match_team" type="string" value=
                "hometeam" />
71          </event>
72          <event name="AwayTeamReceiving" src=
            "scores.category.match.receiving.awayteam.player" index="id"
            channel="livePlayer,consoleJSON" >
```

FIG. 2B

```
73              <attribute name="name" type="string"/>
74              <attribute name="yards" type="int"/>
75              <attribute name="total_receptions" type="int"/>
76              <attribute name="average" type="int"/>
77              <attribute name="receiving_touch_downs" type="int"/>
78              <attribute name="longest_reception" type="int"/>
79              <attribute name="two_pt" type="int"/>
80              <attribute name="id" type="int"/>
81              <attribute name="match_team" type="string" value=
                "awayteam" />
82          </event>
83          <channels>
84              <channel name="consoleJSON" output="console" format=
                "JSON" />
85              <channel name="consoleXML" output="console" format="XML"
                />
86              <channel name="consoleInfo" output="console" format=
                "INFO" />
87              <channel  name="teamStarter" output="MySQL" format=
                "mysql" url="tcp://127.0.0.1:3306" user="user" password=
                "XXXXXXXX1" >
88                  <table database="saem" name="lineups">
89                      <column name="name" type="string" value="name" />
90                      <column name="player_id" type="index" value="id"
                        />
91                      <column name="match_team_id" type="string" value=
                        "match_team" />
92                      <column name="created" type="int" value="now()" />
93                      <column name="match_id" type="db" value=
                        "matches:id=match_id:match_id" />
94                  </table>
95              </channel>
96              <channel  name="match" output="MySQL" format="mysql" url=
                "tcp://127.0.0.1:3306" user="user" password="XXXXXXXX2" >
97                  <table database="saem" name="matches">
98                      <column name="match_id" type="index" value=
                        "contestID" />
99                      <column name="status" type="string" value=
                        "status">
100                         <string string="Not Started" value="Future"/>
101                         <string string="Final" value="Final"/>
102                         <string string="Postponed" value="Post" />
103                         <string string="*" value="Activ"/>
104                     </column>
105                     <column name="ft_score" type="string" value=
                        "hometeam.totalscore - awayteam.totalscore" />
```

FIG. 2C

```
106             </table>
107         </channel>
108         <channel name="liveMatch" output="AMQP" format="json" url
            ="tcp://127.0.0.1:5672" user="guest" password=
            "XXXXXXXXX3">
109             <queue exchange="saem" name="live">
110                 <attribute name="sport_id" type="int" value=
                    "sport_id" />
111                 <attribute name="game_id" type="db" value=
                    "matches:id=match_id:contestID" />
112                 <attribute name="feed" type="JSON" value="match"
                    />
113                 <attribute name="created" type="int" value=
                    "now()" />
114             </queue>
115         </channel>
116         <channel name="livePlayer" output="AMQP" format="json"
            url="tcp://127.0.0.1:5672" user="guest" password=
            "XXXXXXXXX4">
117             <queue exchange="saem" name="live">
118                 <attribute name="sport_id" type="int" value=
                    "sport_id" />
119                 <attribute name="game_id" type="db" value=
                    "matches:id=match_id:match_contestID" />
120                 <attribute name="feed" type="JSON" value="player"
                    />
121                 <attribute name="created" type="int" value=
                    "now()" />
122             </queue>
123         </channel>
124
125     </channels>
126 </realtime>
127 <triggers>
128     <match>
129         <trigger name="WinsTheGame" label="Wins The Game"
130             condition="$match->status == 'Final' &&
                $match->%team->totalscore >
                $match->%otherteam->totalscore"/>
131         <trigger name="Lose The Game" label="Loose The Game"
132             condition="$match->status == 'Final' &&
                $match->%team->totalscore <
                $match->%otherteam->totalscore"/>
133         <trigger name="HomeTeamWinsGame" label="Wins Home"
134             condition "$match->status == 'Final' &&
                $match->%team->totalscore >
```

FIG. 2D

```
                        $match->%otherteam->totalscore && '%team' ==
                        'hometeam'/>
135                 <trigger name="AwayTeamWinsGame" label="Wins Away"
136                     condition="$match->status == 'Final' &&
                        $match->%team->totalscore >
                        $match->%otherteam->totalscore && '%team ==
                        'awayteam'/>
137                     <trigger name="PointsScored" label="Points
                        Scored" condition="$match->%team->totalscore
                        >= %d"/>
138                     <trigger name="ScoreSpread" label="Score
                        Spread" condition=
                        "abs($match->hometeam->totalscore -
                        $match->awayteam->totalscore) >= %d" />
139             </match>
140             <player>
141                 <trigger name="PassingYards" label="Passing Yards"
142                     condition="player->id == %s && ($player->entry
                        == 'AwayTeamPassing' || $player->entry ==
                        'HomeTeamPassing) && $player->yards >= $d"/>
143                 <trigger name="RushingYards" label="Rushing Yards"
144                     condition "$player->id == %s && ($player->entry
                        == 'AwayTeamRushing' || $player->entry ==
                        'HomeTeamRushing') && $player->yards >= $d"/>
145                 <trigger name="RecieveingYards" label="Recieveing Yards"
146                     condition="$player->id == %s && ($player->entry
                        == 'AwayTeamReceiving' || $player->entry ==
                        'HomeTeamReceiving') && $player->yards >= $d"/>
147                 <trigger name="ReceivingTD" label="Receiving TD"
148                     condition="$player->id == %s &&
                        $player->passing_touch_downs >= $d"/>
149                 <trigger name="PassingTD" label="Passing TD"
150                     condition="$player->id == %s &&
                        $player->passing_touch_downs >= $d"/>
151                 <trigger name="RushingTD" label="Rushing TD"  condition=
                        "$player->id == %s && $player->rushing_touch_downs >= $d"
                        />
152                 <trigger name="Sacks" label="Sacks"  condition=
                        "$player->id == %s && $player->sacks >= $d"/>
153             </player>
154         </triggers>
155         <fixture>
156             <feeds refresh="30">
157                 <feed url="
                        ████████████████/getfeed/XXXXXXXXXXXXXXXXXXXXXXXXX
                        /football/nfl-shedule" />
```

FIG. 2E

```
158         </feeds>
159         <entry name="tournament" src="shedules.tournament" index="id"
              >
160             <attribute name="id" type="int" propagate="true" />
161             <attribute name="name" type="string" propagate="true" />
162         </entry>
163         <entry name="matches" src="shedules.tournament.week.matches">
164             <attribute name="date" type="string" propagate="true"/>
165             <attribute name="timezone" type="string"  propagate=
                "true" />
166         </entry>
167         <entry name="match" src=
              "shedules.tournament.week.matches.match" index="contestID"
              channel="match,local_team_matches,away_team_matches" >
168             <attribute name="formatted_date" type="string" />
169             <attribute name="time" type="string" >
170                 <string string="TBD" value="12:00 PM" />
171                 <string string="Postponed" value="12:00 PM" />
172             </attribute>
173             <attribute name="status" type="string">
174                 <string string="Not Started" value="Future"/>
175                 <string string="Final" value="Final"/>
176                 <string string="Postponed" value="Post" />
177                 <string string="*" value="Activ"/>
178             </attribute>
179             <attribute name="contestID" type="int"/>
180             <attribute name="hometeam.name" type="string" />
181             <attribute name="hometeam.id" type="int" />
182             <attribute name="hometeam.totalscore" type="int" />
183             <attribute name="awayteam.name" type="string" />
184             <attribute name="awayteam.id" type="int" />
185             <attribute name="awayteam.totalscore" type="int" />
186         </entry>
187         <channels>
188             <channel name="consoleJSON" output="console" format=
                "JSON" />
189             <channel name="consoleXML" output="console" format="XML"
                />
190             <channel name="consoleInfo" output="console" format=
                "INFO" />
191             <channel  name="match" output="MySQL" format="mysql" url=
                "tcp://127.0.0.1:3306" user="user" password="XXXXXXXX5" >
192                 <table database="saem" name="matches">
193                     <column name="match_id" type="index" value=
                      "contestID" />
194                     <column name="date_time" type="datetime" value=
```

FIG. 2F

```
195             "%I:%M %p %d.%m.%Y|time_formatted_date " />
                <column name="status" type="timezone" value=
                "matches_timezone" />
196             <column name="status" type="string" value=
                "status" />
197             <column name="localteam" type="string" value=
                "hometeam.name" />
198             <column name="visitorteam" type="string" value=
                "awayteam.name" />
199             <column name="ft_score" type="string" value=
                "hometeam.totalscore - awayteam.totalscore" />
200             <column name="sport_id" type="int" value=
                "sport_id" />
201             <column name="tournament_id" type="int" value=
                "tournament_id" />
202             <column name="tournament_name" type="int" value=
                "sport" />
203             <column name="created" type="int" value="now()" />
204         </table>
205     </channel>
206     <channel name="local_team_matches" output="MySQL" format=
        "mysql" url="tcp://127.0.0.1:3306" user="root" password=
        "XXXXXXXXX6" >
207         <table database="saem" name="match_teams">
208             <column name="type" type="string" value=
                "localteam" />
209             <column name="name" type="string" value=
                "hometeam.name" />
210             <column name="score" type="int" value=
                "hometeam.totalscore" />
211             <column name="match_id" type="db" value=
                "matches:id=match_id:contestID" />
212             <column name="match_team_id" type="index" value=
                "hometeam.id" />
213             <column name="created" type="int" value="now()" />
214         </table>
215     </channel>
216     <channel name="away_team_matches" output="MySQL" format=
        "mysql" url="tcp://127.0.0.1:3306" user="root" password=
        "XXXXXXXXX7" >
217         <table database="saem" name="match_teams">
218             <column name="type" type="string" value=
                "visitorteam" />
219             <column name="name" type="string" value=
                "awayteam.name" />
220             <column name="score" type="int" value=
```

FIG. 2G

```
221                    "visitorteam.totalscore" />
                       <column name="match_id" type="db" value=
                       "matches:id=match_id:contestID" />
222                    <column name="match_team_id" type="index" value=
                       "awayteam.id" />
223                    <column name="created" type="int" value="now()" />
224                </table>
225             </channel>
226          </channels>
227       </fixture>
228       <players>
229          <feeds refresh="30">
230             <feed url="
                 ████████████████████████/getfeed/XXXXXXXXXXXXXXXXXXXXXX
                 /football/ari_rosters" />
231             <feed url="
                 ████████████████████████/getfeed/XXXXXXXXXXXXXXXXXXXXXX
                 /football/atl_rosters" />
232             <feed url="
                 ████████████████████████/getfeed/XXXXXXXXXXXXXXXXXXXXXX
                 /football/bal_rosters" />
233             <feed url="
                 ████████████████████████/getfeed/XXXXXXXXXXXXXXXXXXXXXX
                 /football/buf_rosters" />
234             <feed url="
                 ████████████████████████/getfeed/XXXXXXXXXXXXXXXXXXXXXX
                 /football/car_rosters" />
235             <feed url="
                 ████████████████████████/getfeed/XXXXXXXXXXXXXXXXXXXXXX
                 /football/chi_rosters" />
236             <feed url="
                 ████████████████████████/getfeed/XXXXXXXXXXXXXXXXXXXXXX
                 /football/cin_rosters" />
237             <feed url="
                 ████████████████████████/getfeed/XXXXXXXXXXXXXXXXXXXXXX
                 /football/cle_rosters" />
238             <feed url="
                 ████████████████████████/getfeed/XXXXXXXXXXXXXXXXXXXXXX
                 /football/dal_rosters" />
239             <feed url="
                 ████████████████████████/getfeed/XXXXXXXXXXXXXXXXXXXXXX
                 /football/den_rosters" />
240             <feed url="
                 ████████████████████████/getfeed/XXXXXXXXXXXXXXXXXXXXXX
                 /football/det_rosters" />
241             <feed url="
```

FIG. 2H

```
242  <feed url="███████████████/getfeed/XXXXXXXXXXXXXXXXXXXXXXXX
                /football/gb_rosters" />
243  <feed url="███████████████/getfeed/XXXXXXXXXXXXXXXXXXXXXXXX
                /football/hou_rosters" />
244  <feed url="███████████████/getfeed/XXXXXXXXXXXXXXXXXXXXXXXX
                /football/ind_rosters" />
245  <feed url="███████████████/getfeed/XXXXXXXXXXXXXXXXXXXXXXXX
                /football/jac_rosters" />
246  <feed url="███████████████/getfeed/XXXXXXXXXXXXXXXXXXXXXXXX
                /football/kc_rosters" />
247  <feed url="███████████████/getfeed/XXXXXXXXXXXXXXXXXXXXXXXX
                /football/mia_rosters" />
248  <feed url="███████████████/getfeed/XXXXXXXXXXXXXXXXXXXXXXXX
                /football/min_rosters" />
249  <feed url="███████████████/getfeed/XXXXXXXXXXXXXXXXXXXXXXXX
                /football/no_rosters" />
250  <feed url="███████████████/getfeed/XXXXXXXXXXXXXXXXXXXXXXXX
                /football/nyg_rosters" />
251  <feed url="███████████████/getfeed/XXXXXXXXXXXXXXXXXXXXXXXX
                /football/nyj_rosters" />
252  <feed url="███████████████/getfeed/XXXXXXXXXXXXXXXXXXXXXXXX
                /football/oak_rosters" />
253  <feed url="███████████████/getfeed/XXXXXXXXXXXXXXXXXXXXXXXX
                /football/phi_rosters" />
254  <feed url="███████████████/getfeed/XXXXXXXXXXXXXXXXXXXXXXXX
                /football/pit_rosters" />
255  <feed url="███████████████/getfeed/XXXXXXXXXXXXXXXXXXXXXXXX
                /football/sd_rosters" />
256  <feed url="███████████████/getfeed/XXXXXXXXXXXXXXXXXXXXXXXX
                /football/sea_rosters" />
     <feed url="███████████████/getfeed/XXXXXXXXXXXXXXXXXXXXXXXX
```

FIG. 2I

```
                /football/sf_rosters" />
257             <feed url="
                                    /getfeed/XXXXXXXXXXXXXXXXXXXXXXXX
                /football/stl_rosters" />
258             <feed url="
                                    /getfeed/XXXXXXXXXXXXXXXXXXXXXXXX
                /football/tb_rosters" />
259             <feed url="
                                    /getfeed/XXXXXXXXXXXXXXXXXXXXXXXX
                /football/ten_rosters" />
260             <feed url="
                                    /getfeed/XXXXXXXXXXXXXXXXXXXXXXXX
                /football/wsh_rosters" />
261         </feeds>
262         <entry name="team" src="team" index="id">
263             <attribute name="id" type="int" />
264             <attribute name="name" type="string" propagate="true" />
265         </entry>
266         <entry name="player" src="team.position.player" index="id"
                channel="player">
267             <attribute name="name" type="string" />
268             <attribute name="number" type="int" />
269             <attribute name="id" type="int" />
270         </entry>
271         <channels>
272             <channel name="player" output="MySQL" format="mysql" url=
                "tcp://127.0.0.1:3306" user="user" password="XXXXXXX" >
273                 <table database="saem" name="players">
274                     <column name="name" type="string" value="name" />
275                     <column name="player_id" type="index" value="id"
                        />
276                     <column name="number" type="int" value="number" />
277                     <column name="created" type="int" value="now()" />
278                     <column name="team_name" type="string" value=
                        "team_name" />
279                 </table>
280             </channel>
281         </channels>
282     </players>
283 </league>
```

FIG. 2J

```xml
1   <?xml version="1.0" encoding="ISO-8859-1" ?>
2   <scores sport="football">
3       <category name="USA: NFL" id="1">
4           <match contestID="17682" date="Sunday, February 6, 2011"
                timezone="EST" status="Final" time="6:29 PM" formatted_date=
                "06.02.2011">
5               <hometeam name="Green Bay Packers" q1="14" q2="7" q3="0"
                    q4="10" ot="" totalscore="31" id="1698" />
6               <awayteam name="Pittsburgh Steelers" q1="0" q2="10" q3=
                    "7" q4="8" ot="" totalscore="25" id="1694" />
7               <events>
8                   <firstquarter>
9                       <event team="hometeam" min="03:44" player="Jordy
                            Nelson 29 Yd Pass From Aaron Rodgers (Mason
                            Crosby Kick)" type="TD" home_score="7" away_score
                            ="0" />
10                      <event team="hometeam" min="03:20" player="Nick
                            Collins 37 Yd Interception Return (Mason Crosby
                            Kick)" type="TD" home_score="14" away_score="0" />
11                  </firstquarter>
12                  <secondquarter>
13                      <event team="awayteam" min="11:08" player="Shaun
                            Suisham 33 Yd" type="FG" home_score="14"
                            away_score="3" />
14                      <event team="hometeam" min="02:24" player="Greg
                            Jennings 21 Yd Pass From Aaron Rodgers (Mason
                            Crosby Kick)" type="TD" home_score="21"
                            away_score="3" />
15                      <event team="awayteam" min="00:39" player="Hines
                            Ward 8 Yd Pass From Ben Roethlisberger (Shaun
                            Suisham Kick)" type="TD" home_score="21"
                            away_score="10" />
16                  </secondquarter>
17                  <thirdquarter>
18                      <event team="awayteam" min="10:19" player=
                            "Rashard Mendenhall 8 Yd Run (Shaun Suisham
                            Kick)" type="TD" home_score="21" away_score="17"
                            />
19                  </thirdquarter>
20                  <fourthquarter>
21                      <event team="hometeam" min="11:57" player="Greg
                            Jennings 8 Yd Pass From Aaron Rodgers (Mason
                            Crosby Kick)" type="TD" home_score="28"
                            away_score="17" />
22                      <event team="awayteam" min="07:34" player="Mike
                            Wallace 25 Yd Pass From Ben Roethlisberger
```

FIG. 3A

```
                            (Antwaan Randle El Run For Two-Point Conversion)"
                            type="TD" home_score="28" away_score="25" />
23                      <event team="hometeam" min="02:07" player="Mason
                            Crosby 23 Yd" type="FG" home_score="31"
                            away_score="25" />
24                  </fourthquarter>
25                  <overtime>
26                  </overtime>
27              </events>
28              <team_stats>
29                  <hometeam>
30                      <first_downs total="15" passing="11" rushing="4"
                            from_penalties="0" />
31                      <plays total="55" />
32                      <yards total="338" />
33                      <passing total="288" comp_att="24-39"
                            yards_per_pass="7.4" />
34                      <rushings total="50" attempts="13" yards_per_rush
                            ="3.8" />
35                      <red_zone made_att="1-2" />
36                      <penalties total="7-67" />
37                      <turnovers total="0" lost_fumbles="0"
                            interceptions="0" />
38                      <posession total="26:35" />
39                  </hometeam>
40                  <awayteam>
41                      <first_downs total="19" passing="11" rushing="8"
                            from_penalties="0" />
42                      <plays total="64" />
43                      <yards total="387" />
44                      <passing total="261" comp_att="25-40"
                            yards_per_pass="6.5" />
45                      <rushings total="126" attempts="23"
                            yards_per_rush="5.5" />
46                      <red_zone made_att="2-3" />
47                      <penalties total="6-55" />
48                      <turnovers total="3" lost_fumbles="1"
                            interceptions="2" />
49                      <posession total="33:25" />
50                  </awayteam>
51              </team_stats>
52              <passing>
53                  <hometeam>
54                      <player name="B. Roethlisberger" comp_att="25/40"
                            yards="263" average="6.6" passing_touch_downs=
                            "2" interceptions="2" rating="77.4" id="5536" />
```

FIG. 3B

```
55              </hometeam>
56              <awayteam>
57                  <player name="A. Rodgers" comp_att="24/39" yards=
                    "304" average="7.8" passing_touch_downs="3"
                    interceptions="0" rating="111.5" id="8439" />
58              </awayteam>
59          </passing>
60          <rushing>
61              <hometeam>
62                  <player name="R. Mendenhall" total_rushes="14"
                    yards="63" average="4.5" rushing_touch_downs="1"
                    longest_rush="17" id="11257" />
63                  <player name="B. Roethlisberger" total_rushes="4"
                     yards="31" average="7.8" rushing_touch_downs="0"
                     longest_rush="18" id="5536" />
64                  <player name="I. Redman" total_rushes="2" yards=
                    "19" average="9.5" rushing_touch_downs="0"
                    longest_rush="16" id="12898" />
65                  <player name="M. Moore" total_rushes="3" yards=
                    "13" average="4.3" rushing_touch_downs="0"
                    longest_rush="7" id="5644" />
66              </hometeam>
67              <awayteam>
68                  <player name="J. Starks" total_rushes="11" yards=
                    "52" average="4.7" rushing_touch_downs="0"
                    longest_rush="14" id="13214" />
69                  <player name="A. Rodgers" total_rushes="2" yards=
                    "-2" average="-1.0" rushing_touch_downs="0"
                    longest_rush="0" id="8439" />
70              </awayteam>
71          </rushing>
72          <receiving>
73              <hometeam>
74                  <player name="M. Wallace" total_receptions="9"
                    yards="89" average="9.9" receiving_touch_downs=
                    "1" longest_reception="25" id="12601" />
75                  <player name="H. Ward" total_receptions="7" yards
                    ="78" average="11.1" receiving_touch_downs="1"
                    longest_reception="17" id="1494" />
76                  <player name="A. Randle El" total_receptions="2"
                    yards="50" average="25.0" receiving_touch_downs=
                    "0" longest_reception="37" id="3590" />
77                  <player name="E. Sanders" total_receptions="2"
                    yards="17" average="8.5" receiving_touch_downs=
                    "0" longest_reception="13" id="13295" />
78                  <player name="H. Miller" total_receptions="2"
```

FIG. 3C

```
                        yards="12" average="6.0" receiving_touch_downs=
                        "0" longest_reception="15" id="8444" />
79                  <player name="M. Spaeth" total_receptions="1"
                        yards="9" average="9.0" receiving_touch_downs="0"
                        longest_reception="9" id="10521" />
80                  <player name="R. Mendenhall" total_receptions="1"
                        yards="7" average="7.0" receiving_touch_downs=
                        "0" longest_reception="7" id="11257" />
81                  <player name="A. Brown" total_receptions="1"
                        yards="1" average="1.0" receiving_touch_downs="0"
                        longest_reception="1" id="13934" />
82              </hometeam>
83              <awayteam>
84                  <player name="J. Nelson" total_receptions="9"
                        yards="140" average="15.6" receiving_touch_downs=
                        "1" longest_reception="38" id="11270" />
85                  <player name="G. Jennings" total_receptions="4"
                        yards="64" average="16.0" receiving_touch_downs=
                        "2" longest_reception="31" id="9638" />
86                  <player name="J. Jones" total_receptions="5"
                        yards="50" average="10.0" receiving_touch_downs=
                        "0" longest_reception="21" id="10522" />
87                  <player name="D. Driver" total_receptions="2"
                        yards="28" average="14.0" receiving_touch_downs=
                        "0" longest_reception="24" id="1966" />
88                  <player name="B. Jackson" total_receptions="1"
                        yards="14" average="14.0" receiving_touch_downs=
                        "0" longest_reception="14" id="10507" />
89                  <player name="A. Quarless" total_receptions="1"
                        yards="5" average="5.0" receiving_touch_downs="0"
                        longest_reception="5" id="13440" />
90                  <player name="K. Hall" total_receptions="1" yards
                        ="2" average="2.0" receiving_touch_downs="0"
                        longest_reception="2" id="10634" />
91                  <player name="T. Crabtree" total_receptions="1"
                        yards="1" average="1.0" receiving_touch_downs="0"
                        longest_reception="1" id="13102" />
92                  <player name="J. Starks" total_receptions="0"
                        yards="0" average="0.0" receiving_touch_downs="0"
                        longest_reception="0" id="13214" />
93                  <player name="B. Swain" total_receptions="0"
                        yards="0" average="0.0" receiving_touch_downs="0"
                        longest_reception="0" id="11451" />
94              </awayteam>
95          </receiving>
96          <fumbles>
```

FIG. 3D

```
 97            <hometeam>
 98                <player name="R. Mendenhall" total="1" lost="1"
                   rec="0" id="11257" />
 99            </hometeam>
100            <awayteam>
101                <player name="T. Williams" total="1" lost="0" rec
                   ="0" id="5432" />
102                <player name="D. Bishop" total="0" lost="0" rec=
                   "1" id="10635" />
103            </awayteam>
104        </fumbles>
105        <interceptions>
106            <hometeam>
107            </hometeam>
108            <awayteam>
109                <player name="N. Collins" total_interceptions="1"
                    yards="37" intercepted_touch_downs="1" id="8465"
                    />
110                <player name="J. Bush" total_interceptions="1"
                   yards="1" intercepted_touch_downs="0" id="10342"
                   />
111            </awayteam>
112        </interceptions>
113        <defensive>
114            <hometeam>
115                <player name="R. Clark" tackles="8"
                   unassisted_tackles="6" sacks="0" tfl="0"
                   passes_defended="0" qb_hts="0"
                   interceptions_for_touch_downs="0" id="4301" />
116                <player name="I. Taylor" tackles="5"
                   unassisted_tackles="5" sacks="0" tfl="0"
                   passes_defended="0" qb_hts="0"
                   interceptions_for_touch_downs="0" id="4583" />
117                <player name="B. McFadden" tackles="4"
                   unassisted_tackles="4" sacks="0" tfl="0"
                   passes_defended="0" qb_hts="0"
                   interceptions_for_touch_downs="0" id="8476" />
118                <player name="L. Woodley" tackles="3"
                   unassisted_tackles="3" sacks="1" tfl="1"
                   passes_defended="0" qb_hts="2"
                   interceptions_for_touch_downs="0" id="10490" />
119                <player name="T. Polamalu" tackles="3"
                   unassisted_tackles="3" sacks="0" tfl="0"
                   passes_defended="0" qb_hts="0"
                   interceptions_for_touch_downs="0" id="4474" />
120                <player name="L. Timmons" tackles="3"
```

FIG. 3E

```
                              unassisted_tackles="3" sacks="0" tfl="1"
                              passes_defended="0" qb_hts="0"
                              interceptions_for_touch_downs="0" id="10459" />
121                           <player name="B. Keisel" tackles="3"
                              unassisted_tackles="2" sacks="0" tfl="0"
                              passes_defended="0" qb_hts="1"
                              interceptions_for_touch_downs="0" id="3743" />
122                           <player name="W. Gay" tackles="2"
                              unassisted_tackles="2" sacks="0" tfl="0"
                              passes_defended="1" qb_hts="0"
                              interceptions_for_touch_downs="0" id="10613" />
123                           <player name="A. Madison" tackles="2"
                              unassisted_tackles="1" sacks="0" tfl="0"
                              passes_defended="0" qb_hts="0"
                              interceptions_for_touch_downs="0" id="10020" />
124                           <player name="J. Farrior" tackles="2"
                              unassisted_tackles="1" sacks="0" tfl="0"
                              passes_defended="0" qb_hts="0"
                              interceptions_for_touch_downs="0" id="1219" />
125                           <player name="J. Harrison" tackles="1"
                              unassisted_tackles="1" sacks="1" tfl="1"
                              passes_defended="0" qb_hts="3"
                              interceptions_for_touch_downs="0" id="4433" />
126                           <player name="Z. Hood" tackles="1"
                              unassisted_tackles="1" sacks="1" tfl="1"
                              passes_defended="0" qb_hts="2"
                              interceptions_for_touch_downs="0" id="12442" />
127                           <player name="C. Hampton" tackles="1"
                              unassisted_tackles="1" sacks="0" tfl="0"
                              passes_defended="0" qb_hts="0"
                              interceptions_for_touch_downs="0" id="2567" />
128                           <player name="D. Legursky" tackles="1"
                              unassisted_tackles="1" sacks="0" tfl="0"
                              passes_defended="0" qb_hts="0"
                              interceptions_for_touch_downs="0" id="11556" />
129                           <player name="K. Fox" tackles="1"
                              unassisted_tackles="1" sacks="0" tfl="0"
                              passes_defended="0" qb_hts="0"
                              interceptions_for_touch_downs="0" id="5618" />
130                           <player name="M. Wallace" tackles="1"
                              unassisted_tackles="1" sacks="0" tfl="0"
                              passes_defended="0" qb_hts="0"
                              interceptions_for_touch_downs="0" id="12601" />
131                           <player name="R. Mundy" tackles="1"
                              unassisted_tackles="0" sacks="0" tfl="0"
                              passes_defended="0" qb_hts="0"
```

FIG. 3F

```
                    interceptions_for_touch_downs="0" id="11428" />
132             </hometeam>
133             <awayteam>
134                 <player name="C. Peprah" tackles="10"
                    unassisted_tackles="9" sacks="0" tfl="0"
                    passes_defended="0" qb_hts="0"
                    interceptions_for_touch_downs="0" id="9744" />
135                 <player name="D. Bishop" tackles="8"
                    unassisted_tackles="6" sacks="0" tfl="3"
                    passes_defended "0" qb_hts "0"
                    interceptions_for_touch_downs="0" id="10635" />
136                 <player name="T. Williams" tackles="6"
                    unassisted_tackles="3" sacks="0" tfl="0"
                    passes_defended="1" qb_hts="0"
                    interceptions_for_touch_downs="0" id="5432" />
137                 <player name="F. Zombo" tackles="5"
                    unassisted_tackles "5" sacks "1" tfl "2"
                    passes_defended="0" qb_hts="1"
                    interceptions_for_touch_downs="0" id="13779" />
138                 <player name="J. Bush" tackles="5"
                    unassisted_tackles="4" sacks="0" tfl="0"
                    passes_defended="1" qb_hts="1"
                    interceptions_for_touch_downs="0" id="10342" />
139                 <player name="A. Hawk" tackles="5"
                    unassisted_tackles="2" sacks="0" tfl="0"
                    passes_defended="1" qb_hts="0"
                    interceptions_for_touch_downs="0" id="9591" />
140                 <player name="N. Collins" tackles="4"
                    unassisted_tackles="4" sacks="0" tfl="0"
                    passes_defended="1" qb_hts="0"
                    interceptions_for_touch_downs="1" id="8465" />
141                 <player name="C. Matthews" tackles="3"
                    unassisted_tackles="3" sacks="0" tfl="0"
                    passes_defended "1" qb_hts "0"
                    interceptions_for_touch_downs="0" id="12438" />
142                 <player name="B. Swain" tackles="3"
                    unassisted_tackles="3" sacks="0" tfl="0"
                    passes_defended="0" qb_hts="0"
                    interceptions_for_touch_downs="0" id="11451" />
143                 <player name="C. Woodson" tackles="3"
                    unassisted_tackles "2" sacks "0" tfl "0"
                    passes_defended="0" qb_hts="0"
                    interceptions_for_touch_downs="0" id="1442" />
144                 <player name="R. Pickett" tackles="2"
                    unassisted_tackles="2" sacks="0" tfl="0"
                    passes_defended="0" qb_hts="0"
```

FIG. 3G

```
145         interceptions_for_touch_downs="0" id="2577" />
            <player name="S. Shields" tackles="2"
            unassisted_tackles="2" sacks="0" tfl="0"
            passes_defended="0" qb_hts="0"
            interceptions_for_touch_downs="0" id="13769" />
146         <player name="K. Hall" tackles="1"
            unassisted_tackles="1" sacks="0" tfl="0"
            passes_defended="0" qb_hts="0"
            interceptions_for_touch_downs="0" id="10634" />
147         <player name="A. Bigby" tackles="1"
            unassisted_tackles="1" sacks="0" tfl="0"
            passes_defended="0" qb_hts="0"
            interceptions_for_touch_downs="0" id="9445" />
148         <player name="M. Wilhelm" tackles="1"
            unassisted_tackles="1" sacks="0" tfl="0"
            passes_defended="0" qb_hts="0"
            interceptions_for_touch_downs="0" id="4570" />
149         <player name="T. Crabtree" tackles="1"
            unassisted_tackles="1" sacks="0" tfl="0"
            passes_defended="0" qb_hts="0"
            interceptions_for_touch_downs="0" id="13102" />
150         <player name="P. Lee" tackles="1"
            unassisted_tackles="1" sacks="0" tfl="0"
            passes_defended="0" qb_hts="0"
            interceptions_for_touch_downs="0" id="11294" />
151         <player name="M. Crosby" tackles="1"
            unassisted_tackles="1" sacks="0" tfl="0"
            passes_defended="0" qb_hts="0"
            interceptions_for_touch_downs="0" id="10636" />
152         <player name="D. Briggs" tackles="1"
            unassisted_tackles="0" sacks="0" tfl="0"
            passes_defended="0" qb_hts="0"
            interceptions_for_touch_downs="0" id="12911" />
153         <player name="C. Wilson" tackles="0"
            unassisted_tackles="0" sacks="0" tfl="0"
            passes_defended="0" qb_hts="1"
            interceptions_for_touch_downs="0" id="13491" />
154         <player name="H. Green" tackles="0"
            unassisted_tackles="0" sacks="0" tfl="0"
            passes_defended="0" qb_hts="1"
            interceptions_for_touch_downs="0" id="3767" />
155         <player name="B. Raji" tackles="0"
            unassisted_tackles="0" sacks="0" tfl="0"
            passes_defended="0" qb_hts="1"
            interceptions_for_touch_downs="0" id="12447" />
156         </awayteam>
```

FIG. 3H

```
157              </defensive>
158              <kick_returns>
159                  <hometeam>
160                      <player name="A. Brown" total="4" yards="88"
                         average="22.0" lg="38" td="0" id="13934" />
161                      <player name="I. Redman" total="1" yards="12"
                         average="12.0" lg="12" td="0" id="12898" />
162                      <player name="M. Moore" total="1" yards="11"
                         average="11.0" lg="11" td="0" id="5644" />
163                  </hometeam>
164                  <awayteam>
165                      <player name="P. Lee" total="2" yards="44"
                         average="22.0" lg="28" td="0" id="11294" />
166                      <player name="J. Nelson" total="1" yards="19"
                         average="19.0" lg="19" td="0" id="11270" />
167                  </awayteam>
168              </kick_returns>
169              <punt_returns>
170                  <hometeam>
171                      <player name="A. Brown" total="4" yards="5"
                         average="1.3" lg="2" td="0" id="13934" />
172                  </hometeam>
173                  <awayteam>
174                      <player name="T. Williams" total="1" yards="0"
                         average="0.0" lg="0" td="0" id="5432" />
175                  </awayteam>
176              </punt_returns>
177              <kicking>
178                  <hometeam>
179                      <player name="S. Suisham" field_goals="1/2" pct=
                         "50.0" long="33" extra_point="2/2" points="5" id=
                         "9361" />
180                  </hometeam>
181                  <awayteam>
182                      <player name="M. Crosby" field_goals="1/1" pct=
                         "100.0" long="23" extra_point="4/4" points="7" id
                         ="10636" />
183                  </awayteam>
184              </kicking>
185              <punting>
186                  <hometeam>
187                      <player name="J. Kapinos" total="3" yards="153"
                         average="51.0" touchbacks="1" in20="0" lg="56" id
                         ="11201" />
188                  </hometeam>
189                  <awayteam>
```

FIG. 3I

```
190                    <player name="T. Masthay" total="6" yards="243"
                       average="40.5" touchbacks="1" in20="1" lg="51" id
                       ="12998" />
191                </awayteam>
192            </punting>
193        </match>
194    </category>
195 </scores>
196
197
```

FanActivate | My Triggers https://members.fanactivate.com/pilot/campaigns/index/183

Dashboard | My Triggers | Broadcasts | Billing | User Name

Create Triggers

- Free Soda - Sea...
- Busta HR World...
- Go Redwings - ...

Free Soda - Seahawks

General Settings

Edit Trigger —1481

Trigger Name —1301
Free Soda - Seahawks —1303

Text to Join Keyword    Sport —1305
HAWKSODA              Football

Based on —1309
St. Louis Rams VS Seattle Seahawks, 2014-10-19 10:00:00

Trigger —1315
Seattle Seahawks Wins The Game

Trigger Continuation —1317
Yes  ✓ No

Next Game —1319

Broadcast Messages

Welcome Message ? —1331
Knobbe: Welcome Seahawk fans! Anytime the Seahawks win an away game, we are giving FREE soda for a week!
Msg&DataRatesMayApply, TextSTOP2end Reminder Message ?

Statistics —1401

| Registrations | Messages | Clickthrough | Balance |
|---|---|---|---|
| 1 | 2 | 0 | 0.35 |

Progress Chart —1403 — Registrations ---- Messages --- Clickthrough 16
12
8
4
0
  30 Oct  31 Oct  1 Nov  2 Nov  3 Nov  4 Nov  5 Nov

Activity Stream —1405

| Date | Activity | Charge | Balance —1407 |
|---|---|---|---|
| 31 Oct | Messages sent: 4 | $0.20 | $0.20 |
| 1 Nov | Registrations:16 | $0.25 | -$1.30 |

FIG. 14

| FanActivate | Transaction × | | | | | | |
|---|---|---|---|---|---|---|---|
| ← → C | https://members.fanactivate.com/pilot/billings/transactions | | | | | | |

⊖ Dashboard    ✎ My Triggers ▼    ⊘ Broadcasts    ⊛ Billing ▼        ⎔ User Name ▼

✎ Create Triggers

○ ⊘ Free Soca - Sea...
○ ⊘ Busta HR World...
○ ⊘ Go Redwings - ...

Transaction History —1501

Current Balance: $222.85 —1507

[Previous] [Next]

⊛ Add Funds —1505

| Date | Description —1509 | Debits —1511 | Credits —1513 | Balance —1515 |
|---|---|---|---|---|
| 22 Oct | 1517— Sms: 2 | 0.1 | | $222.85 |
| 21 Oct | Sms: 1 | 0.05 | | $222.95 |
| 20 Oct | 1519— Subscription: 1 | 0.25 | | $223.00 |
| 20 Oct | Sms: 1 | 0.05 | | $223.25 |
| 19 Oct | Sms: 1 | 0.05 | | $223.30 |
| 17 Oct | Subscription: 5 | 1.25 | | $223.35 |
| 17 Oct | 1521— Facebook | 0.8 | | $224.60 |
| 17 Oct | Visa | | 225.40 | $225.40 |

SCALABLE SYSTEMS FOR CHANGE DETECTION OF STATISTIC DATA FEEDS ACROSS MULTIPLE SERVERS USING SHARED MEMORY WITH CONFIGURABLE MESSAGING TRIGGERS

TECHNICAL FIELD

Embodiments of present disclosure relate to systems and techniques for analyzing sporting event statistics. More specifically, embodiments of the present disclosure relate to scalably detecting changes to sporting event statistic data.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A live sport feed (such as a sport feed available through the internet) is a way of disseminating live sporting event statistics. In many fields, computer programs may be written to programmatically display sporting statistics found in live feeds, such as the current number of points scored by a team or player. For example, if "Player X" scored 20 points, a website could report, based on a live feed downloaded from a third party, that the game is ongoing and that Player X currently has 20 points scored.

Likewise, sporting statistics may be used at a sporting event itself to illustrate on a scoreboard a team or sporting statistic for a sporting event. For example, a scoreboard at the event may display that "Player X has scored 20 points".

A person may monitor a sporting event statistic manually using a display in order to deliver a message when a sporting statistic reaches a set level. For example, via looking at a sporting statistic display, a user may then send out message over a microphone and audio system that "Player 20 has now scored 20 points".

SUMMARY

The systems, methods, and devices described herein each have several aspects, no single one of which is solely responsible for its desirable attributes. Without limiting the scope of this disclosure, several non-limiting features will now be discussed briefly.

The embodiments described herein provide distinct improvements to computer technology, namely the scalability of computerized trigger based message dissemination. For example, using the multiple process architecture (and in some embodiments, multiple device) contemplated and disclosed in FIG. 1, the system allows for scalability of the system by simply adding additional devices executing additional processes that can interface with and process the information provided in the shared queues. As the popularity of the system increases, only additional devices running additional processes (that can be configured with sport type specific configuration files) need be deployed to provide more processing.

The embodiments described herein also provide distinct improvements to the speed of providing information for reaching sports triggers. For example, the system for detecting a sport trigger is automatic. There need not be a sports analyst present to determine whether a player or team have met a specific sporting event. The computerized analysis of the statistic data is in real-time and can be reported out to subscribers/fans (e.g. out to their physical mobile devices via an API w/subscriber distribution list over SMS or an Instant Messaging method such as iMessage) immediately upon the player's or team's data is present in the feed and analyzed. Additionally, the system can filter the amount of data necessary to process a trigger, and thus result in a faster processing of triggers. For example, the embodiments described herein need not process XML feeds for games on the schedule for which no trigger exists. Additionally, the match event detection processes and/or the statistic trigger processes need not parse specific stats from XML data from an event's feed, or analyze parsed events in a queue, where there are no triggers that could possibly be satisfied based on the event/data to be analyzed. Thus, a large subset of data can be skipped during the parsing of the XML feeds or determining whether triggers are satisfied, resulting in a large processing speed increase. Similarly, because data can often be filter/skipped, less memory is required to overall process all of the feeds available to the system. Thus, advantageously, processing and memory requirements can be reduced via use of one or more embodiments disclosed herein.

In various embodiments, the computing system comprises a hardware computer processor, a shared memory accessible by the computer processor and accessible over a local area or wide area computer network by a second computer processor, and computer readable storage.

In various embodiments, the shared memory is comprised of a first queue, a second queue, and computer readable storage storing first instructions, second instructions, third instructions, and fourth instructions. In some embodiments, the first queue is configured to receive messages from a plurality of distinct match event detection processes for a plurality of sports types. The first queue is also accessible by a plurality of statistic trigger processes. In some embodiments, the second queue is configured to receive messages from the plurality of statistic trigger processes, and is accessible by a plurality of delivery processes.

In various embodiments, the computer readable storage stores first instructions, second instructions, third instructions, and fourth instructions. In various embodiments, the first instructions stored by the computer readable storage may be configured for execution by the computer processor in order to cause the computing system to generate web user interface data for rendering the interactive user interface on a client computing device; receive, from the client computing device, over an external network, the sporting event, the type of sport, the selection of the sports statistic, and the broadcast message; create a configurable statistic trigger, based at least in part on the sporting event, the type of sport, and the selection of the sports statistic; store the configurable statistic trigger in a data store accessible by the computing system; and store the broadcast message in the data store as associated with the configurable statistic trigger. In some embodiments, the interactive user interface is capable of receiving input for a sporting event associated with a time and location for the sporting event; a type of sport for the sporting event; a selection of a sports statistic generatable by one or more players at the sporting event; and a broadcast message, wherein the broadcast message is displayed within a test mobile user interface in the interactive user interface, the test mobile user interface configured to display a user inputted broadcast message in real-time in a sample text message within the test mobile user interface.

In various embodiments, the second instructions may be configured for execution by the computer processor in order to cause the computing system to process a sport specific configuration, wherein the sport specific configuration is associated with the type of sport for the sporting event; download a live data feed from a network location of the one or more network locations; parse the live data feed according to sport specific configuration; detect changed data between the live data feed and a previous version of the live data feed; based on the changed data, determine a live statistic change event for a team or player participating in the sporting event; and store the live statistic change event on the in the first queue in the shared memory. In some embodiments, the sport specific configuration file may be comprised of a feed configuration, the feed configuration indicating one or more network locations to download real-time sport statistics for the type of sport for the sporting event; a plurality of event configurations, each event configuration indicating the location of at least one type of statistic available in the feed related to the type of sport for the sporting event and one or more players or teams; and a plurality of trigger configurations, each trigger configuration indicating a statistic precondition associated with the type of sport for the sporting event, that may be used to satisfy a configurable statistic trigger.

In various embodiments, the third instructions may be configured for execution by the computer processor in order to cause the computing system to retrieve the configurable statistic trigger from the data store; access the first queue and retrieve the live statistic change event; remove the live statistic change event from the first queue; determine, based on at least the live statistic change event, whether the configurable statistic trigger has been satisfied; and in response to the determination that the configurable statistic trigger has been satisfied, store an indication message in the second queue in the shared memory to disseminate the broadcast message.

In various embodiments, the fourth instructions may be configured for execution by the computer processor in order to cause the computing system to access the second queue and retrieve the indication message; access the broadcast message from the data store or the indication message; and invoke an API to instruct a third computing system to send the broadcast message to a configurable group of recipients through one or more mobile networks, the third computing system accessible via local area or wide area computer network.

In some embodiments, the API instructs the third computing system to send the broadcast message via mobile text, SMS messaging, or social networks. In some embodiments, the configurable group of recipients comprises a listing of mobile telephone numbers, wherein each of the mobile telephone numbers subscribed to the receive the broadcast message via one or more text or SMS messages. In some embodiments, the one or more text or SMS messages comprises a plurality of messages, wherein at least one of the plurality of messages comprises a confirmation of subscription.

In some embodiments, the third instructions configured for execution by the computer processor further cause the computing system to access the first queue and retrieve a second live statistic change event, the second live statistic change event indicating an end to the sporting event; determine, in response to analyzing the second live statistic change event, that the configurable statistic trigger has not been satisfied; and in response to the determination that the configurable statistic trigger has not been satisfied, store a negative indication message in the second queue in the shared memory to disseminate a second broadcast message. In some embodiments, the second broadcast message is displayed within the test mobile user interface in the interactive user interface, the test mobile user interface configured to display a user inputted second broadcast message in real-time in a second sample text message within the test mobile user interface.

In some embodiments the computer readable storage stores fifth instructions, the fifth instructions configured for execution by the computer processor in order to cause the computing system to periodically download from a second network location of the one or more network locations a second data feed; and parse the second data feed to extract a plurality of future sporting events. In some embodiments, the interactive user interface indicates that a future sporting event of the plurality of future sporting events is selectable within the interactive user interface for creating a second configurable statistic trigger. In some embodiments, the interactive user interface provides a web based dashboard to track a plurality of configurable statistic triggers, the plurality of configurable statistic triggers comprising the configurable statistic trigger and the second configurable statistic trigger. In some embodiments, the dashboard indicates a cost associated with disseminating the broadcast message. In some embodiments, the configurable statistic trigger is satisfied when a selected team wins the sporting event, or another condition such as a number of goals, points, or spread is achieved. In some embodiments, the configurable statistic trigger is satisfied when a sports statistic for a player in the sporting event reaches threshold amount.

In various embodiments, the method is a computerized method for disseminating a broadcast message, comprising a computing device executing instructions on one or more hardware processors. In some embodiments, the computing device generates user interface data for rendering an interactive user interface on a client computing device; receiving, from the client computing device, over an external network, the sporting event, the type of sport, the selection of the sports statistic, and the broadcast message; creating a configurable statistic trigger, based at least in part on the sporting event, the type of sport, and the selection of the sports statistic; storing the configurable statistic trigger in a data store accessible by the computing system; storing the broadcast message in the data store as associated with the configurable statistic trigger; processing a sport specific configuration associated with a type of sport for the sporting event; periodically: downloading a live data feed from a network location of the one or more network locations, parsing the live data feed according to sport specific configuration, and detecting changed data between the live data feed and a previous version of the live data feed; based on the changed data, determining a live statistic change event for a team or player participating in the sporting event; storing the live statistic change event on the in the first queue in a shared memory, the first queue configured to receive messages from a plurality of distinct match event detection processes for a plurality of sport types, the first queue accessible by a plurality of statistic trigger processes; accessing the first queue and retrieving the live statistic change event; removing the live statistic change event from the first queue; determining, based on at least the live statistic change event, whether the configurable statistic trigger has been satisfied; in response to determining that the configurable statistic trigger has been satisfied, storing an indication message a the second queue in the shared memory to disseminate the broadcast message, the second queue configured to receive messages from the plurality of statistic trigger processes, and accessible by a plurality of delivery processes; accessing the second queue and retrieving the indication message; accessing the broadcast message from the data store or the indication message; and invoking an API to instruct a third computing system to send the broadcast message to a configurable group of recipients through one or more mobile networks, the third computing system accessible via local area or wide area computer network.

In some embodiments, the interactive user interface is capable of receiving input, for a sporting event associated with a time and location for the sporting event; a type of sport for the sporting event; a selection of a sports statistic generatable by one or more players at the sporting event; and a broadcast message, wherein the broadcast message is displayed within a test mobile user interface in the interactive user interface, the test mobile user interface configured to display a user inputted broadcast message in real-time in a sample text message within the test mobile user interface.

In some embodiments, the sport specific configuration file may comprise a feed configuration, the feed configuration indicating one or more network locations to download real-time sport statistics for the type of sport for the sporting event; a plurality of event configurations, each event configuration indicating the location of at least one type of statistic available in the feed related to the type of sport for the sporting event and one or more players or teams; and a plurality of trigger configurations, each trigger configuration indicating a statistic precondition associated with the type of sport for the sporting event, that may be used to satisfy a configurable statistic trigger.

In some embodiments, the API instructs the third computing system to send the broadcast message via mobile text or SMS messaging. In some embodiments, the configurable group of recipients comprises a listing of mobile telephone numbers, wherein each of the mobile telephone numbers subscribed to the receive the broadcast message via one or more text or SMS messages. In some embodiments, the one or more text or SMS messages comprises a plurality of messages, wherein at least one of the plurality of messages comprises a confirmation of subscription.

In some embodiments, the computerized method for disseminating a broadcast message comprises a computing device executing instructions on one or more hardware processors by accessing the first queue and retrieving a second live statistic change event, the second live statistic change event indicating an end to the sporting event; determining, in response to analyzing the second live statistic change event, that the configurable statistic trigger has not been satisfied; and in response to determining that the configurable statistic trigger has not been satisfied, storing a negative indication message in the second queue in the shared memory to disseminate a second broadcast message. In some embodiments, the second broadcast message is displayed within the test mobile user interface in the interactive user interface, the test mobile user interface configured to display a user inputted second broadcast message in real-time in a second sample text message within the test mobile user interface.

In some embodiments, the computerized method for disseminating a broadcast message comprises a computing device executing instructions on one or more hardware processors by, on a periodic basis, downloading from a second network location of the one or more network locations a second data feed; and parsing the second data feed to extract a plurality of future sporting events. In some embodiments, the interactive user interface indicates that a future sporting event of the plurality of future sporting events is selectable within the interactive user interface for creating a second configurable statistic trigger.

In some embodiments, the interactive user interface provides a visual dashboard to track a plurality of configurable statistic triggers, the plurality of configurable statistic triggers comprising the configurable statistic trigger and the second configurable statistic trigger. In some embodiments, the visual dashboard indicates a cost associated with disseminating the broadcast message. In some embodiments, the configurable statistic trigger is satisfied when a selected team wins the sporting event. In some embodiments, the configurable statistic trigger is satisfied when a sports statistic for a player in the sporting event reaches threshold amount.

In various embodiments, the system is a computing system configured to access one or more electronic live sports data sources in response to inputs. This allows the system to automatically filter events and trigger messages to a plurality of pre-identified list of recipients. Embodiments of the computer system (the "system") disclosed herein relate to a computer system (which may comprise one more devices—such as multiple servers) designed to provide interactive, graphical user interfaces (also referred to herein as "user interfaces") for enabling non-technical users to quickly and dynamically generate, edit, and update sport statistic triggers. The user interfaces are interactive such that a user may make selections and provide inputs, and to preview their broadcast messages associated with and/or triggered upon a sports statistic trigger. In response to various user inputs, the system automatically parse and analyze complex data feeds comprising real-time statistics for players and teams playing at a sporting event. The resulting data may be rapidly analyzed to determine whether a broadcast has been triggered based on satisfaction of a user selected sports statistic trigger. The broadcast message may be disseminated via a variety of user selected methods.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIGS. 2A, 2B, 2C, 2D, 2E, 2F, 2G, 2H, 2I, and 2J illustrate an example configuration file for configuring process(es) for a sports statistic change detection system.

FIGS. 3A, 3B, 3C, 3D, 3E, 3F, 3G, 3H, 3I, and 3J illustrate an example sports statistic feed for a live sporting event.

FIG. 12 is an example user interface for a dashboard user interface.

FIG. 14 is an example user interface for viewing information about a sports statistic trigger.

FIG. 15 is an example user interface for viewing information about transactions within a sports statistic trigger system.

FIG. 17 is an example user interface for adding billing information within a sports statistic trigger system.

DETAILED DESCRIPTION

Figure 1:
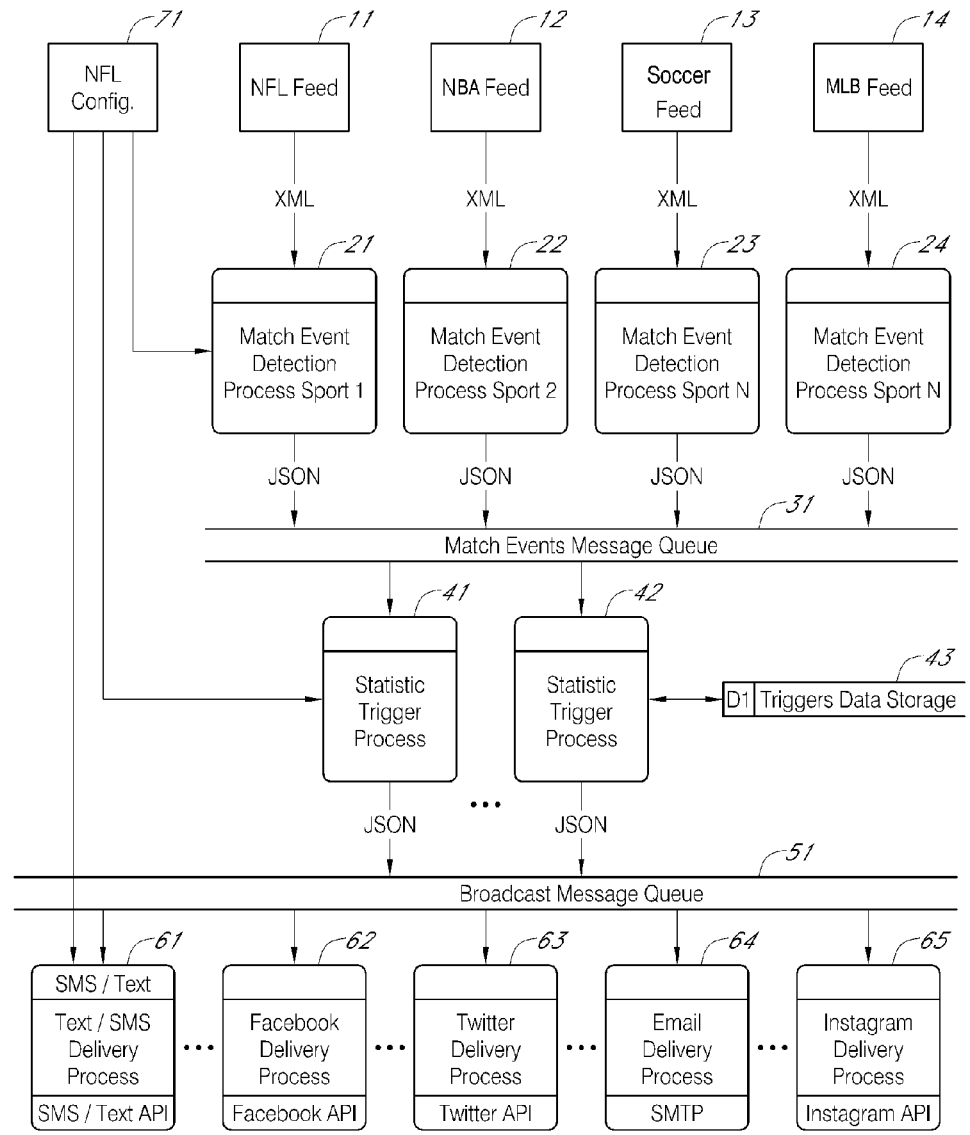
FIG. 1 illustrates an example scalable embodiment of a sports statistic change detection system.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

1.0 General Overview

As described above, embodiments of the present disclosure relate to computerized systems and methods designed to provide users a way to create statistic triggers and analyze statistic feeds in order to determine, based on updates to statistic feeds, whether or not a trigger has been satisfied. Based on the satisfaction of one or more statistic trigger, a broadcast message may be delivered to subscribers using a combination, or variety, of delivery methods and channels according to a distribution list.

In various embodiments, the system described herein is designed to detect the occurrence of sport-specific events for a sporting event, including player and team-specific events, and determine whether user-set statistic triggers are satisfied. The system may use one or more processes that analyze and examine one or more game feeds. The number of processes can be tailored to allow for scalability and improved deployment depending on the number of sports, feeds, users and subscribers.

Further, as described herein, in some embodiments the system may be configured and/or designed to generate a user interface, useable for setting up statistic triggers by the user. The user may set up statistic triggers for various team-based or player-based statistics. For example, a statistic trigger can be set for when the Los Angeles Lakers score more than 100 points in a game. When the statistic triggers are satisfied, a number of broadcast processes can be configured to deliver a broadcast message through a variety of channels—such as text/SMS, Facebook, Twitter, Instagram, or email—to a list of subscribers stored in a database. Alternatively, the broadcast message and the list of subscribers can be provided to a third party for delivery.

The system may be useful to, for example, advertisers, marketers, or other broadcasters that wish to draw attention to a product or service ("broadcasters"). Such broadcasters often need to disseminate marketing information, provide notice of free samples to create buzz for new or continuing products provide coupons, or generally advertise and create branding for a product, service or firm. One traditional method is to provide free samples or coupons for a product based on a team or player scoring a high number of points. For example, a basketball team may have a deal with a local taco company for the taco company to provide free tacos if the team scores more than 110 points in a game. Notice that this condition may be met and a message may be put on a big screen at the sporting event itself, or announced at the sporting event itself. Advantageously, the system described herein provides automatic computerized methods for providing notice of a met sporting condition to people outside a sporting venue if they are on a distribution list and/or subscribed to the broadcast messages that are provided when the trigger is satisfied. Thus, the embodiments described herein provide distinct improvements to non-computer technology in the field of sport statistic trigger based message dissemination for sporting events/fans.

Referring now to FIG. 1, one embodiment is shown as an example of a scalable multi-process system for detecting sport-specific events for a sporting event, including player and team-specific events, and determining whether those events meet statistic triggers which may then launch a broadcast message to a subscribed audience.

FIG. 1 has three distinct types of processes: match event detection processes such as process 21, 22, 23, and 24; statistic trigger processes or engines such as statistic trigger 41 and 42; and broadcast delivery processes or engines such as texts or SMS delivery process 61, Facebook delivery process 62, Twitter delivery process 63, email delivery process 64 and/or Instagram delivery process 65. These are example processes, and processes are not limited to the processes shown. Instead, for scalability, each process may focus on a specific sport, or a specific type of event, or a specific type of message. For example, match event detection engine or process 21 is for sport 1, which may be the NFL. Whereas match event detection engine or process 22 for sport 2 may be for the NBA, and so on and so forth. For example, processes 23 and 24 may be for soccer 13 or MLB. The sport that the process is for may correspond to the type of sporting event statistic feed that the process or engine can analyze. For example, match event detection process 21 may be configured to analyze a feed for an NFL game such as NFL feed 11. Likewise, match event detection process for sport 2, 22, may be configured to analyze an NBA feed such as NBA feed 12. These feeds, such as feed 11, 12, 13, and 14, can be written in XML or any language that organizes data. In the alternative, the feeds can be in fixed-format field records which do not have descriptors of the types of data that is contained within them, but instead is based on an understanding between the two parties ahead of time what each field in the records contain.

Each process, such as process 21, 22, 23, 24, processes 41 or 42, or likewise processes 62, 63, 64, and 65, can be each individual programs or threads within a single program that performs the functionality described herein for that specific process. The system is designed so that multiple processes—for a single sport, for evaluating triggers, or for a single type of message broadcast—can be run on one or multiple systems. For example, there may be more than one match event detection process 21 for the NFL in the system so that multiple games can be analyzed at the same time and/or multiple processes can examine the same game feed. This allows for scalability and deployment so that additional machines that execute the described processes herein can be brought online, so long as communication between the processes is allowed by the system. For example, match events message queue 31 allows for intercommunication between any of the match event detection processes and the statistic trigger processes. As another example, statistic trigger process 41 and 42, or any other statistic trigger process, can use the broadcast message queue to communicate messages to broadcast through the various types of delivery processes, such as 61, 62, 63, 64, or 65. If more processing power is required in order to scale the system up for more users or for more additional sports, then additional processes that run on the same computer, or additional computers, may be deployed in order to scale up processing power. That is one of the advantages for implementing a statistic trigger detection system and broadcast message system as described in FIG. 1 and in the example embodiment.

The various feeds such as NFL feed 11, NBA feed 12, soccer feed 13, major league baseball feed 14, are just examples of data feeds that can be downloaded from third party services on the internet that provide sports statistics for live events. Typically a third party service will allow for a subscription of various types of feeds for each type of sport. For example, the NFL feed 11 may comprise a list, in XML feed, of upcoming matches based on a league schedule, a listing of current players on rosters on a team, a listing of the location of all the games, the game schedules, the game times, when they will start, the starting pitchers, etc. The feed may also include statistics of ongoing, completed, or yet to be started games. An example of a feed for a game can be found in FIG. 3. These are all examples of various types of feeds that may be inputted into the statistic change detection and broadcast system disclosed herein. These feeds may come as single files. For example, the schedule, players, and game files can all be separate XML feed files that are downloadable through the web, or they could be non-XML feeds that are based on push messages from servers on the internet. As one who is skilled in the art would recognize, the exact methodology for how the data from the statistic feeds is made available is not important. Rather, the fact that the data is available in a live format, for consumption by the system, allows for the analysis of the data by the system. Such data is available over the network.

So for example, in FIG. 1 the NFL feed may be a feed for a game, or multiple feeds for many games. For example, there might be more than one NFL feed going on at the same time. Therefore, there might be multiple files that are available for download, one for each game at the same time. These feeds are typically updated somewhere on the order of every few seconds, to every 30 seconds, to every minute, and therefore, a periodic download based on those time intervals is recommended. So a match event detection process 21 may be analyzing a specific game, which has statistics that are recorded in NFL feed 11. Likewise, another NFL process, running on a different computer or the same computer, could be analyzing a different NFL feed at the same time. Similarly, a different process could also be analyzing the same feed and, via a show of memory, could be detecting changes based on the same live feed and updating the shared memory based on any changes detected.

In the example embodiment depicted in FIG. 1, the XML data of NFL feed 11, which is periodically downloaded, is processed by match event detection process for the NFL, as configured in an NFL configuration 71. Each type of sport may have its own configuration. Therefore, there may be other types of configurations for NBA, soccer, Major League Baseball, hockey, etc. An example of an NFL configuration can be found in FIG. 2. As one skilled in the art would recognize, such configurations are merely representative of a configuration that could apply to any sport. NFL configuration 71 is customized so that the match event detection process need not be specifically programmed for processing NFL feeds. Instead, NFL configuration 71 provides the information necessary to match event detection process 21, which may be identical, as far as the compiled or interpreted software is concerned, as process 22, 23, 24 and so on. Only the NFL configuration may be different, and each process may need a different configuration to process a different sport. This allows for easy and scalable deployment, so that the same code can essentially execute different feeds for different sports while being the same identical code. Match event detection process 21 may, for example, periodically compare a previous statistic from a previous game feed to a statistic from a future or present-received feed. For example, after a game starts, a game's feed may start changing and updating as players score various points. As a player's points starts increasing, various events may be detected by process 21 based on a comparison of the old points that a player may have that is stored in shared memory, or in some embodiments non-shared memory, to the most recent data downloaded from the feed. If there is such a change, an event may be triggered and stored on the match events message queue 31 for additional processing later to be performed by statistic trigger process 41 or 42 and so on. Thus, each match event detection process parses the XML feeds and to detect team and player events. For example, a team may score a run in a baseball game, which may trigger an event to be stored on match events message queue 31. As another example, a player may score a goal in hockey and because a player statistic is detected in a previous version as moving from one score to two scores, the comparison may lead such an event to be stored in the message queue.

In some embodiments, not every game is analyzed by a match event detection process. Instead, only those games are analyzed that could possibly trigger a message broadcast via a trigger stored in data storage 43. For example, if a trigger is configured in data storage 43 for a Chicago Bulls game, where the trigger would be satisfied if the Bulls scored more than 60 points in a game, but there was no trigger for a separate but distinct game involving the Denver Nuggets and Golden State Warriors, then the Bulls game may be analyzed for events whereas the Golden State Warriors versus Nuggets game would not. This is to minimize the amount of processing done by the system in the case where no trigger could possibly ever be triggered from a game because there are no triggers that could satisfy such conditions based on that game and data storage 43. More information on how, in the example embodiment, the match detection engine processes work can be found in FIG. 4.

Storage of events in the queue may take place using a FIFO queue, where JSON is used to store data event objects in the queue. For example, JSON stands for java script object notation, and it is an open standard that uses human-readable text to transmit data objects consisting of attribute value pairs, is primarily used to transmit data between the server and an application, and can be used as an alternative to XML. For more information on JSON please refer to RFC 7159.

For example, each event can have a structure that may list the game as a key with a value of the date of the game, the teams playing the game, and what type of sport it is, and then the actual event update, which may consist of indicating a team or a player as having scored more points or having additional fouls or whatever type of event, is described within the JSON object. That is then stored on the queue for eventual retrieval and processing by the statistic trigger processes such as 41 and 42 and so on.

Statistic trigger processes 41 and 42 then determine whether the events received via message queue 31 can satisfy triggers in the trigger data storage 43. The data storage described herein may be: one data storage comprising a storage area network; or network detached storage using one or more distinct servers that may, in totality, create a logical storage location; or, on the other hand, may be broken up into many different storage devices using different storage protocols. As one skilled in the art would recognize, the exact methodology for storing data and information such as an SQL database, in shared memory, in a hierarchical database, or a flat file, etc. is not necessary to be of one particular type. Based on how the invention is implemented, the exact methodology may change or one type of methodology may have distinct advantages over another.

Nevertheless, the statistic trigger process 41 and 42 and so on receive information from the NFL configuration about what triggers are available to be satisfied for any game. Triggers from data storage 43 may be read by the statistic trigger processes to determine the specific triggers for that game. Then based on the information received from the match event detection engine processes via match events message queue 31, the specific events can be analyzed to determine whether that satisfies a trigger. For example, if a trigger is on Kobe Bryant scoring 30 points in a game, then upon the event that indicates that Kobe Bryant has now scored 30 points in a game as delivered via match events message queue 31, statistic trigger process 41 may then indicate in the broadcast message queue via a JSON object that the specific trigger for Kobe Bryant can be triggered for delivery to a variety of different delivery mechanisms. The specific trigger may be input by the user into the system via the input systems contemplated and disclosed later in the specification, or by any other means. For example, based on a configuration of the trigger and on the configuration of the specific sport type, such as from NFL configuration 71, a variety of message delivery options may be available including text, SMS, Facebook delivery, Twitter delivery, email delivery, or Instagram delivery, or any other message delivery type.

For example, various processes may listen to the broadcast message queue for statistic triggers which may then enable the various delivery processes to send out a broadcast message. For example, text/SMS delivery process 61 may listen on the broadcast message queue for triggers that have been satisfied. Then based on a database lookup or information already stored within the message in the queue, it can determine that a broadcast message is supposed to be sent via SMS or text and then delivering that message to a list of subscribers configured within data storage in a database that is either given to the system upfront or via the end users subscribing to the service.

In one embodiment, the text/SMS delivery process may send a message and a list of phone numbers to a third party service for delivery of the text or SMS message. That third party service may then deliver the message via actual SMS and/or use a text service, such as Apple's Push Notification Service (APNS) or Google Cloud Messaging Service (GCM), which does not necessarily require transmission over the cellular network via SMS and may instead use the traditional internet. Additionally the message can be sent using popular social networks, like Facebook, Twitter or Instagram.

Likewise, the Facebook delivery process may post a message to a user's Facebook page for all to see based on satisfaction of a trigger. Processes 63, 64, 65 likewise may deliver messages via Twitter, email, or Instagram when a trigger is satisfied. More than one channel may be specified for a broadcast message to go out. For example, processes 61, 62, and 63 may all be analyzing the same broadcast message on the broadcast message queue in order to respectively deliver the broadcast message to the end consumer via the various methods. The broadcast message itself may be stored in the database or may actually be provided via the message on the message queue.

As one skilled in the art would see, FIG. 1 is an example embodiment of how a scalable system may be implemented to detect changes in sporting statistics and to trigger message broadcasts. Another embodiment may instead have a single process that implements the functionality of the match event detection processes, the statistic trigger processes, and the delivery processes and may not use a shared memory or message queue for interprocess communication. Instead the embodiment may, via traditional function library calls, use a standard non-threaded or threaded process to handle the same functionality implemented via the event detection processes, statistic trigger processes, and delivery processes.

Referring now to FIG. 2, FIG. 2 illustrates a sample configuration file for the various processes that will analyze a particular type of sport. Such configuration files may be written in any structural language, including XML as described here. On line 1, the league sport may be identified as NFL. Then various configurations may be used to indicate how each program is to operate to analyze data for the type of sport. For example, in lines 3-5, it is described that the feed for NFL scores can be refreshed every 30 seconds. Based on the feeds downloaded, various events can be detected. These events can be configured via an event tag. For example, on lines 6-16, an event called "match" can be detected which may have a status of "not started", "final", "postponed", or any other which indicates that the status is active. For example, the NFL feed may contain a status for the feed indicating that the game hasn't started yet, is over, has been postponed, etc. The value—such as the "not started" value on line 8, the "final" value on line 9, or the "postponed" value on line 10—may be the actual text used in the XML feeds for a NFL live game. These can be translated into "future", "final", "post", etc. type of statuses for the match events. The value "*" on Line 11 has a special meaning: any other text that does not match any of the strings previously defined will be translated to "Activ". This is necessary because during an NFL game the status attribute shows "first quarter", "second quarter", "third quarter", "four quarter", "overtime". This allows a determination of whether or not a match has started and, thus, whether processing for statistic triggers should happen for an event. When an event is live, then match events can be analyzed and statistic triggers can trigger broadcast messages. However, when an event is not active then no analysis need take place. For the event name "match", the actual feed and where you would find the match data can be referenced and configured in the tag. For example, the "src" portion of the event tag on line 6 indicates that "scores.category.match" is the appropriate area of the XML file to get this match data. Likewise, the tag may indicate how the event can be indexed and what channel, or where, the event should be output to. For example, it can be output to a console, a live match, or match queue. Other attributes can also be detected based on the "scores.category.match" XML tag within the NFL feeds as configured by this example, e.g., the "hometeam.totalscore" and "awayteam.totalscore" may indicate the current scores for those teams in the live NFL feed.

As a second example of an event that can be detected from an NFL live game feed, each quarterback can have some passing years associated with that player. This can be configured so that any process can find where the passing yardage is indicated in the feed. For example here, on line 17, "scores.category.match.passing.hometeam.player" is the appropriate area of the XML NFL feed for a game where this information can be found. Such information can be inserted into various attributes of an event, as indicated by lines 18-26. Likewise, on line 28, the "AwayTeamPassing" event allows the same passing information for the away team to be configured. Similar events can be found in "HomeTeamRushing" on line 39, "AwayTeamRushing" on line 50, "HomeTeamReceiving" on line 61, "AwayTeamReceiving" on line 72, etc. This allows for each team and/or each player to be tracked individually based on their passing, receiving, rushing yards, etc. As configured, a process, such as a match detection process, will read this configuration file prior to execution.

On line 83, the configuration file may indicate the various types of channels that may be used to output detected events. For example, the channel name "consoleJSON" on line 84 may be used to output key value pairs to a console for debugging or tracking purposes. Similarly, "consoleXML" and "consoleInfo" on lines 85 and 86 may also be used to indicate output in various formats to a console.

In another option, a MySQL database may be used in order to store the events. Such as on line 87, a channel called "teamStarter" can use a MySQL user name and password to connect to a starting lineup database where starting lineups may be inserted, for each upcoming match, into the database based on parsed XML data from a third party feed. The configuration may comprise a database name such as on line 88, the user name and password such as on line 87, the IP address to contact the MySQL database or any SQL database on line 87, etc. Then, column names may indicate how to store data within a table in the database as indicated in lines 89-93. Other MySQL channels are also contemplated and can be configured so that a process can use a MySQL or any type of database to store data extracted or detected from a feed. For example, line 97 indicates that another channel for matches, instead of lineups, can store a schedule of current, past, or future games within the MySQL database. Such MySQL database can be considered data storage 43.

In some embodiments, like the one shown in FIG. 1, a channel may be a queue. For example, in line 108, a channel called "liveMatch", and in lines 116, a channel called "livePlayer", may be used to store queued events that are detected between old and new data in a live match based on a previous feed and a current feed. The events are usually detected by the match event detection process such as process 21. For example, the channel "liveMatch" may store match or team-based data whereas the channel "livePlayer" may store player-based data. These data can be stored in a JSON format in a queue. The queue may have various attributes and may actually comprise various queues. For example, in line 113, each message in the queue may have an attribute of the sport type of the "game_id" to identify an individual match, where the information in the queue is match data and when the message was put on the queue. Similar data can be configured for the player-based queue in lines 118-121 based on the channel XML tag starting on line 116. The actual messages in these queues will have specific events detected for a match, such as a team event where a team is scoring or a player event where a specific player is scoring, etc. As described herein, such queues may be implemented using shared memory.

As can be seen, the queues in FIG. 1, such as match events message queue 31 and broadcast message queue 51, can be broken up into many individual queues based on type of sport and/or type of event (such as a match event, team event, or a player event). The number of queues, which could be a single match event queue or a plurality of match event message queues of various different types, may be useful in the scalability of the system. For example, it may be useful to have multiple queues that eliminate the number of processes accessed rather than one queue that many processes access.

Starting on line 127, an example of definable triggers for the NFL is shown. Such triggers would be different for other sports. The triggers can be defined within the configuration file so that any process that analyzes triggers can use the triggers defined for that sport based on the config file. For example, one trigger described in lines 129-130 is whether a team wins the game and the condition is defined within that trigger XML tag for winning the game, which is that the match status must be equal to final and the trigger team score must be greater than the other team score. Similar triggers and their satisfaction conditions are listed on lines 131-138. Starting on line 140, examples are provided that show how there may be various triggers defined for a particular sport that can be used to detect whether a trigger is satisfied based on a player rather than a match or a team. For example, lines 141 can detect whether a player's passing yards exceeds a defined amount of passing yards. Likewise similar triggers can happen based on receiving yards, touch downs, passing touch downs, rushing touch downs, sacks, etc. Starting on line 155, various processes can be configured to download data about a particular type of sport. For example, on line 157 the schedule XML feed may be defined as a URL to grab the schedule, which may consist of a tournament schedule, suggested playoffs, or for normal weekly matches. Starting at line 167, the process can be configured to identify various information in the schedule feed such as who the home team and away teams are, what the status of the match is, whether it's been played or not, etc., based on the XML feed of the schedules. Starting on line 187, there might be various output channels that can be configured for storing the schedules as defined in lines 187-226. Likewise, there may be various URLs for downloading current active rosters of various teams as described in lines 228-261 and various channels for putting those active rosters into a database, or output in another manner, as described in lines 271-281. These later types of configurations are to have a cache of player and schedule-specific data within the MySQL database rather than residing on a third party server. This allows the web user interfaces, as described in FIGS. 12-17, to have cached information that may be used to setup triggers in campaigns for marketing based on a sporting event.

In some embodiments, triggers may be able to track or be satisfied by an individual player or team's long-term performance, as opposed to game performance. For example, a trigger may be satisfied when Kobe Bryant scores a certain number of total points in his career. In some embodiments, triggers may be able to track or be satisfied based on the statistics of two different individuals, even if they are on two different teams. For example, a trigger may be satisfied if Kobe Bryant scores more career points than Michael Jordan. In some embodiments, triggers may be able to track or be satisfied based on the statistics of two different games that occur roughly around the same time. For example, a trigger may be configured to track a pennant race in baseball, where teams race to attain the division title before the end of the season. As a further example, a trigger may be configured to be satisfied if the New York Yankees wins the divisional title.

As described herein, FIG. 2 represents only a sample configuration for the NFL. A configuration file for major league baseball or soccer, etc., will have different specified tags and attribute values that are specific to interpreting the major league baseball or soccer XML feed for each game, the schedules, the player rosters, etc. It will also have different triggers set up for that sport, such as the amount of runs scored or the amount of hits for a player within a specific game, etc. Thus, via use of the configuration file, the differences between the sports may be inserted into the configuration file. Yet, the executable instructions, such as those in match event detection process 21 and the statistic trigger processes and the delivery engine processes, etc., can all be programmed the same with the differences specified in the configuration file for each individual sport, rather than creating separate programs to analyze each individual sport.

Referring now to FIG. 3, FIG. 3 represents an example XML feed for a particular live game that has been recently completed. For example, the XML file represents scores for football as indicated on line 2. The match has an identification number that can be used to refer to the match throughout all processes and events described herein. It may have a status as well as time played, as described on line 4. The home teams and away teams may be identified, as indicated in lines 5 and 6, and various important events may be identified, as in lines 7-27. Notably, these events are distinct from events referred to herein which must be detected based on a change between previous versions and a current version of a feed such as the one in FIG. 3. For example, the events listed in lines 8-27 indicate notable plays in a football game, but they do not indicate the exact moment when a player may have gone from a score of 7 points to 14 points, etc. Therefore, these events listed in the actual feed are not likely to be useful to detect whether a trigger is satisfied in a game. Instead, it is the statistics that are listed in lines 28-51, for a team, or lines 52-192, for individual players, that must be analyzed on an ongoing, periodic basis in order to detect changes in statistics and identify triggerable events. Thus, a process that is used to detect, for example, whether Pittsburgh quarterback Ben Roethlisberger has completed 25 completions, may only be triggered upon the known detection of a change in stats for Ben Roethlisberger from 24 to 25 completions as indicated in line 54. In line 54, 25 completions are indicated and thus if the comparison is done with a previous version or previous statistic for Ben Roethlisberger, as tracked by that player and as downloaded from a previous version of the XML feed, then it will become known on a live, real-time basis that Ben Roethlisberger recently completed his 25th pass. And if there is a trigger for completion of 25 passes, that will be instantly sent to the broadcast message queue for dissemination based on the various subscriptions and configurations described herein.

Figure 4:
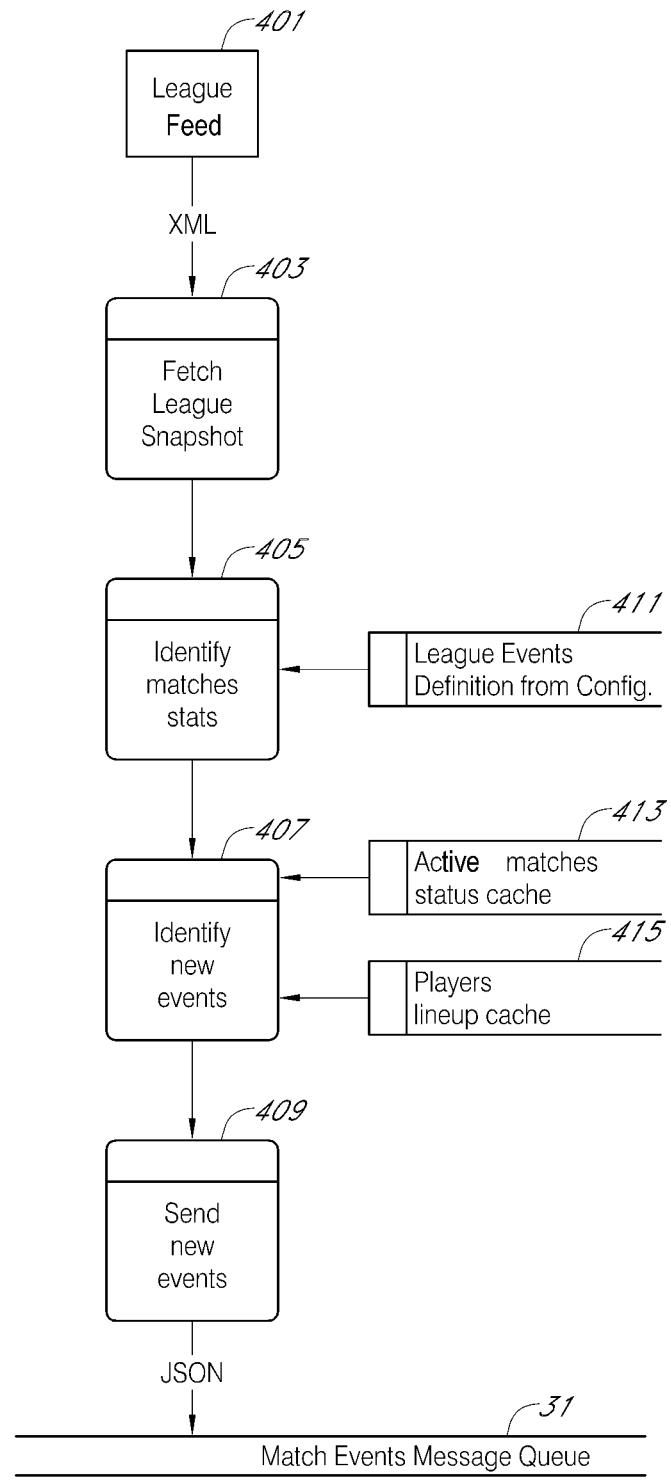
FIG. 4 is a flowchart for an example process for match event detection.

Referring now to FIG. 4, FIG. 4 describes an example process of what match event detection process 21, or any of the match event detection processes, may take after reading their configuration file for the specific sporting event type to identify new events. For example, based on the configuration file, the process may know the URL for a specific event that is going to be played, is being played, or has been played in the past. In step 403, the entire league's snapshot may be downloaded with the schedules. For example, the schedules feed described in the configuration file may be accessed and analyzed to determine, for each league, the matches and stats for each active match to obtain. This determination would be based on the schedule and the actual statistic triggers that are set up within the data storage. For example, one trigger might be that on September 31, the Pittsburgh Steelers would play the Cincinnati Bengals and Ben Roethlisberger must have more than 200 passing yards. Thus, such a match would be identified as having a trigger associated with it in the database and would be identified as a match to analyze and track stats for, whereas another match that did not have any statistic triggers associated with it would not be further analyzed. Once the matches have been identified in step 405, then in step 407 the processes may periodically identify new events. Step 407 may comprise a series of steps. For example, each time a game feed is periodically analyzed, all of the events such as those events that are in the configuration file for the NFL or the major league baseball configuration files may be tracked and updated in shared memory. For example, certain memory may have an active match status cache for each team and player's status, and their various scoring attributes may be updated periodically in the cache. Thus, the cache may represent a previous snapshot in non-XML form that is taken and stored in the shared memory, so that any process can accurately identify an up-to-date snapshot of that game regardless of whether or not that process had read a previous version of the feed. At this point, any changes in the status can be identified as new events and the status itself can be updated to include the most up-to-date information. In addition, the status for each individual player or team entry for a particular match that is in the cache may have a time associated with it for update. This allows multiple processes to work on the same game without conflict. When a status for a team or player has a time-stamp that is beyond the feed that is actively being analyzed by a given process, it will indicate that some other feed has already updated the status for the players, the process that is analyzing the current feed may have been delayed and thus may be acting on old data, and that process should not continue updating the active match status cache 413.

Thus, by comparison of a current XML feed with the status of each team and each player and by knowing the attributes that are associated with all the various triggers for a particular sport, block 407 may identify a new event when there is a change between the feed and the active match status. Any new event may be sent in block 409 to the event message queue and formatted for the queue via a JSON key value pair data structure. As described above, the match events message 231 may be multiple queues. For example, they may be one queue for a particular sport type and another for a different sport type, and each sport specific message queue may be broken down into a further message queue for either team statistics or player statistics. In any event, the match events message queue 31 will have a new identified event that happened. For example, a player's points may have moved from 28 to 30 and that event will be put on the message queue for further processing by the statistic trigger processes.

Figure 5:
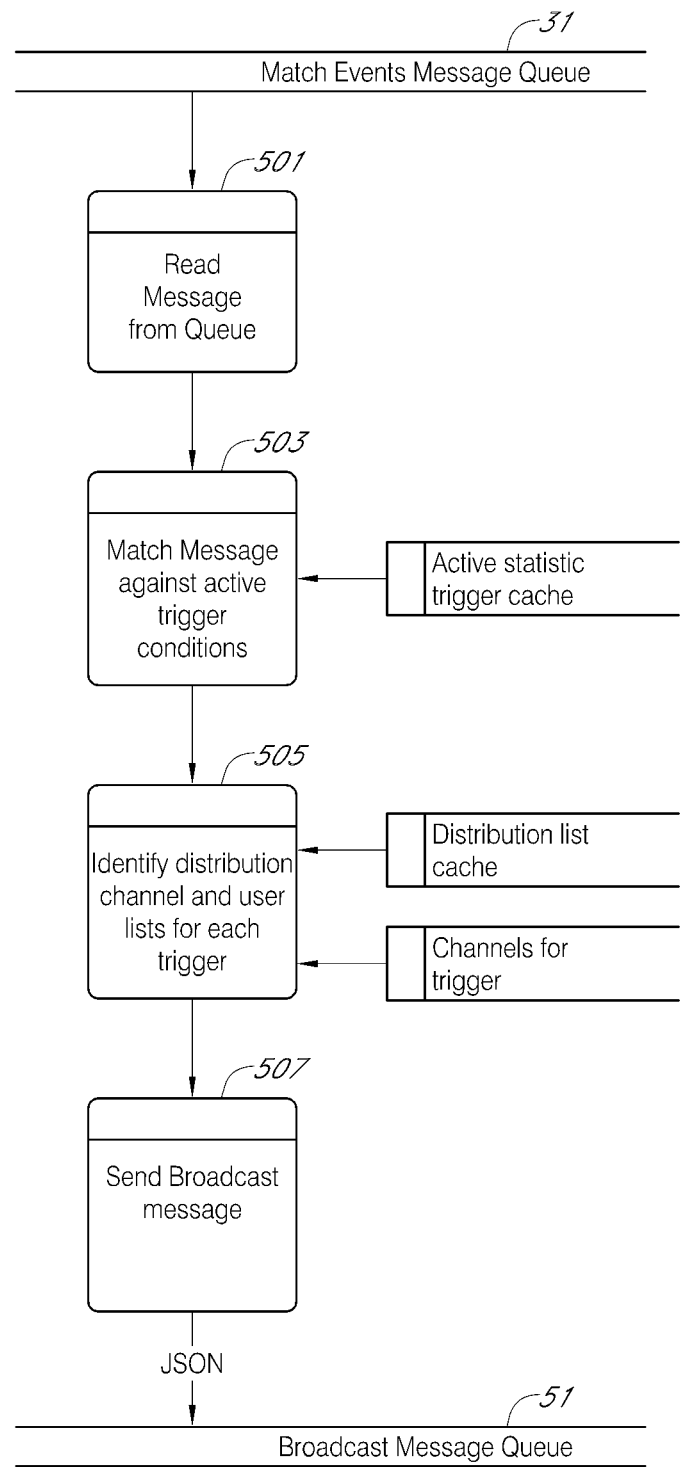
FIG. 5 is a flowchart for an example process for detecting satisfaction of sports statistic triggers.

Referring now to FIG. 5, FIG. 5 represents an example embodiment of a statistic trigger process that reads messages of events from the queue and determines whether a trigger has been satisfied and thus determines whether to send out a broadcast message associated with that trigger. As disclosed herein, each trigger may have various messages associated with it, one of which is a broadcast message when the trigger is satisfied. These messages may be stored in data storage or in a database, such as on an SQL system, such that when the trigger is satisfied the broadcast message will be retrieved at some point during the process and sent out via the delivery processes depending on the configuration of the database. For example, each trigger and/or broadcast message may have associated with it a specific type of delivery such as Facebook, SMS text, Instagram, Twitter, etc. Based on a subscription list and the type of delivery, when a statistic event has been identified and it meets a trigger then a broadcast may be sent out.

For example, in block 501 the queue may be read by a statistic process to load into memory the values from the JSON key value pairs from match events message 231. The event may then be analyzed in step 503 and matched against an active trigger condition. For example, those trigger conditions can be defined in the configuration file for the NFL or specifically set up for a specific event as indicated by a user of the system. For example, although there are many trigger conditions defined in the configuration file, only a specific trigger for a specific user may have been specified, such as Ben Roethlisberger scoring two passing touch downs. The event is then compared to any relevant triggers that are specified for that game for one or more users. If a trigger is satisfied, such as if the event indicates that the second passing touch down by Ben Roethlisberger was scored, then in block 505 a distribution channel and user list for the trigger that is associated with that trigger may be retrieved. As described herein, the user interfaces such as those in FIG. 12, 13, 14, etc. can all be used to set up automatic collection of a distribution list.

Distribution lists can be setup in a number of ways. First, the distribution list may be uploaded from a user to the system, stored in the distribution list cache or database, and the distribution list may be associated with a trigger. For example, the distribution list could be a collection or combination of twitter handles, email addresses, cell phone numbers or any identifier that can be used to broadcast a message. In a second method of creating a distribution list, a text campaign as contemplated in FIGS. 13*b* and 14 can be used to gather email addresses, twitter handles, or mobile cell phone numbers. For example, on a big screen (such as an LCD) at a sporting event, a phone number can be broadcast to everyone at the stadium. Then a person can text that phone number a code to subscribe themselves to a certain trigger. In some embodiments, the subscriber must also confirm subscription by receiving a text message from the system or a third party running the text messages for the system and text back that they somehow confirm subscription to the service. Alternatively, instead of subscribing the mobile phone number, the text subscription method may also be used to collect any other contact information such as a twitter handle, an email address, or Facebook account, etc. Another way to create a distribution list would be to sign up for a campaign through a website. For example, a user of the system could run their own website and collect email addresses for the distribution lists so that broadcast messages would go to those email addresses whenever the trigger is satisfied. This can then be uploaded into the system by the user to use as a distribution list. In some embodiments, the system itself may have a web page or other mechanism, other than the mobile phone mechanism described earlier, to gather subscriptions. In one embodiment, a user may put up on their website a link to email a certain email address, such as trigger@teamacme.com, that can be used to subscribe email addresses to the list. In that scenario, any email address that follows the instructions on the website and emails the indicated address to be added to the distribution list.

In some embodiments, each trigger may also be identified with a number of channels that can be used for broadcasting the broadcast message associated with the trigger. For example, not all triggers need to send text messages. Instead, a specific trigger may have associations in the database indicating that when that trigger is satisfied, the broadcast message is supposed to be sent via Facebook such as via Facebook delivery process 62 and email via email delivery process 64. In this case, only those two distribution channels will be used for satisfaction of that trigger. In another example, there may only be one distribution channel specified and that could be the SMS/text delivery process 61 that can be used to send out SMS/text messages based on a list of mobile phones and the distribution list.

In block 507, the statistic trigger process may then submit via JSON, as just one example, the message to be broadcast to the broadcast message queue 51. This may be a queued message that indicates an identifier for the distribution lists and channels to be triggered plus an identifier for the broadcast message, each of which may be stored in the database and need to be retrieved based on their IDs prior to broadcast. Or it may be putting in the message queue the actual list of addresses to deliver to, the channels to deliver to, and the actual message itself. In some embodiments, there may be multiple messages that may be sent. For example, one message could be configured specifically for Facebook message when the trigger is satisfied, and a second message could be configured specifically for a text/SMS version. Once the send broadcast message is stored within the broadcast message queue 51, then the delivery engines will take data from the broadcast message queue and distribute it, delivering it out either itself or based on a third party program.

Figure 6:
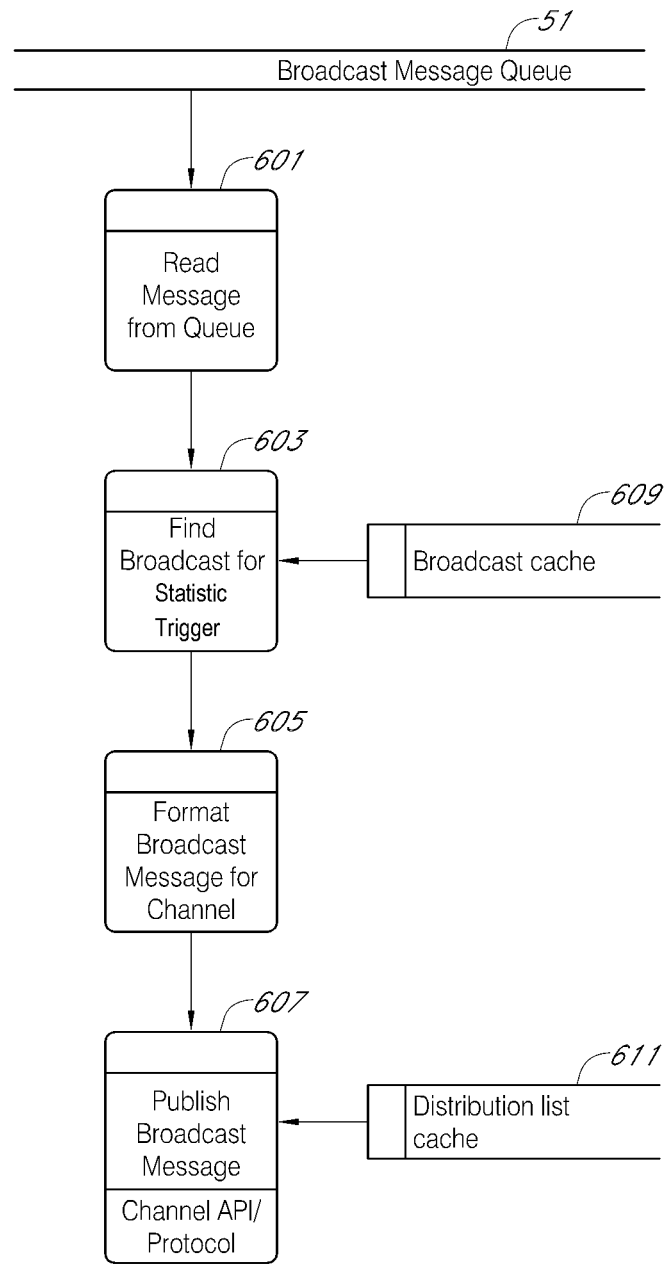
FIG. 6 is a flowchart for an example process for broadcasting a triggered or untriggered message.

FIG. 6 illustrates delivery processes that are accessing the broadcast message queue and broadcasting the broadcast message out via the specific channels described herein. The method or process described in FIG. 6 could be the method or process used by one of the delivery engines, of which there may be multiple delivery engines reading from the broadcast message queue. Alternatively, the broadcast message queue 51 may be separated into multiple broadcast message queues, each of which may reside on the shared memory and can be accessed via the different delivery engines. For example, there may be a broadcast message used specifically for Facebook broadcasts or Twitter broadcasts, etc.

In block 601, an exemplary delivery engine process may read the message from the queue. In this step, if the Twitter delivery engine process is reading from the message queue it may only pickup messages that indicate that they are Twitter messages. Alternatively, a different Facebook delivery engine process could be configured to only read messages configured for the Facebook channel. In this way, each specific delivery process could only read messages that are specifically intended for that process to send out, based on the selected channel for broadcast.

After the message is read from the queue in block 601, in block 603 the broadcast is found for the statistic trigger in the broadcast cache. For example, in the embodiment where the broadcast is not directly in the broadcast message stored in the broadcast message queue, instead the actual text of the broadcast message can be pulled from the database, such as a broadcast cache 609. This can be done based on creating an ID for the broadcast. That ID may be associated with the trigger in a database thus stored in data storage for example.

In block 605, the delivery engine may format the broadcast message for the specific type of channel. For example, for a Facebook post, the broadcast message may be split into multiple paragraphs based on formatting indicators. It may be submitted onto Facebook for all subscribed users to see. As another example, if a Twitter delivery process was formatting the broadcast message, it may truncate the broadcast message to only 140 characters and/or split the broadcast message up among many different 140 character messages sufficient that the entire message is broadcast out via Twitter. In the alternative, using a text or email channel—which may have similar character, plain text, or mime attachment limitations— other formatting schemes can be used such that either the entire broadcast message is sent out over multiple messages on that channel. Or the message itself could be truncated so that it fits within one message on the channel. For example, in block 605 the message that it would be distributed via text may be truncated to a maximum message size that can be sent out via text.

In block 607, the broadcast message may be published to the specific channel medium. For example, based on the identifiers in a distribution list such as mobile phone numbers, each mobile phone number may be texted individually with the broadcast message after the statistic trigger has been satisfied. For example, in text/SMS delivery process 61, the system may invoke a third party API that can receive a message and a list of mobile phone numbers. The third party API may also be contacted via the internet, and it could be a cloud service that can then send out text messages, one or multiple at a time, to each phone number in the distribution list. Alternatively, instead of using actual SMS to send out the messages, shortcuts such as standard Instant Messaging protocols, such as XMPP, OSCAR, Jabber, APNs, and so forth, which use IP instead of SMS can be used instead as a replacement when IP is available.

As another example in block 607, a broadcast message may instead be published to Twitter using a Twitter protocol. For example, a direct message may be sent to each individual subscriber or a broadcast message may be sent via Twitter that simply posts on a user of the system's Twitter feed that the trigger has been satisfied with the custom message wanted by the user. In another embodiment, each email address may be delivered a message containing the broadcast message which may be done via SMTP. Another example includes using an Instagram API. The Instagram delivery engine 65 may send a broadcast message to multiple Instagram members. Such a broadcast message may, instead of comprising text, also comprise an image or comprise an image alone. Such an image may be stored within the database and associated with the satisfied trigger as a broadcast message, and it may be sent via any of the APIs that support images—just like a text message would be sent in combination or alone. Thus, using the channel API protocol or a third party service, each different type of delivery process, based on the type of data it is sending out via a selected channel, may publish the broadcast message differently by using a similar methodology.

Figure 7:
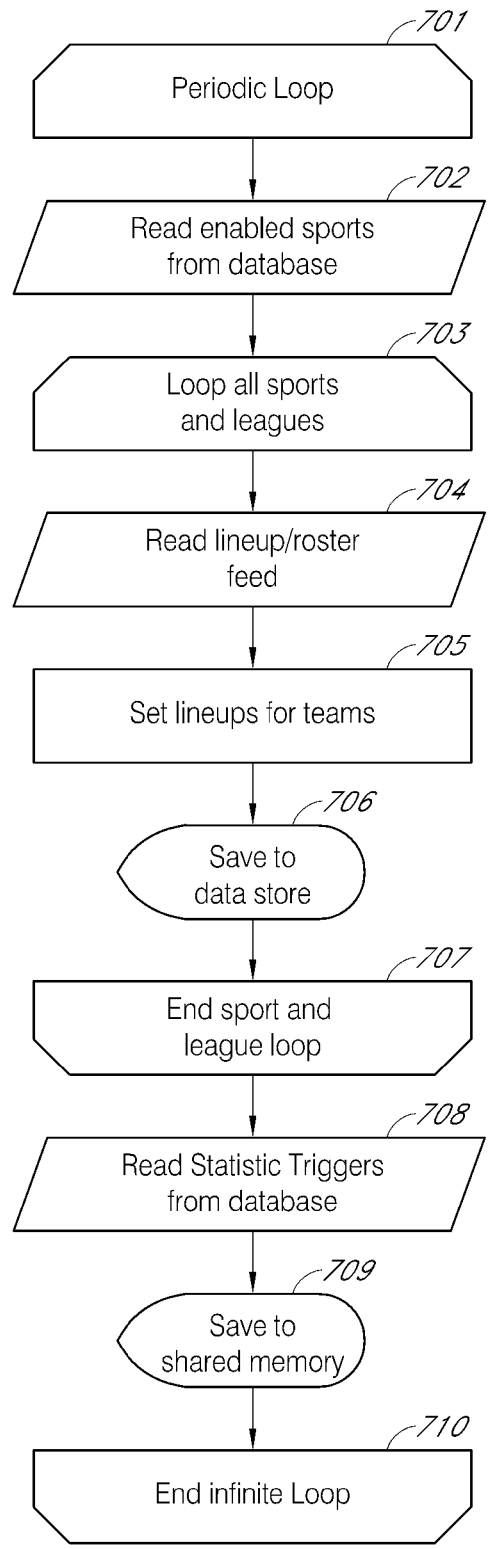
FIG. 7 is a flowchart for an example process for preparing a backend data storage for sports statistic trigger processing and preparation of new triggers.
Figure 8:
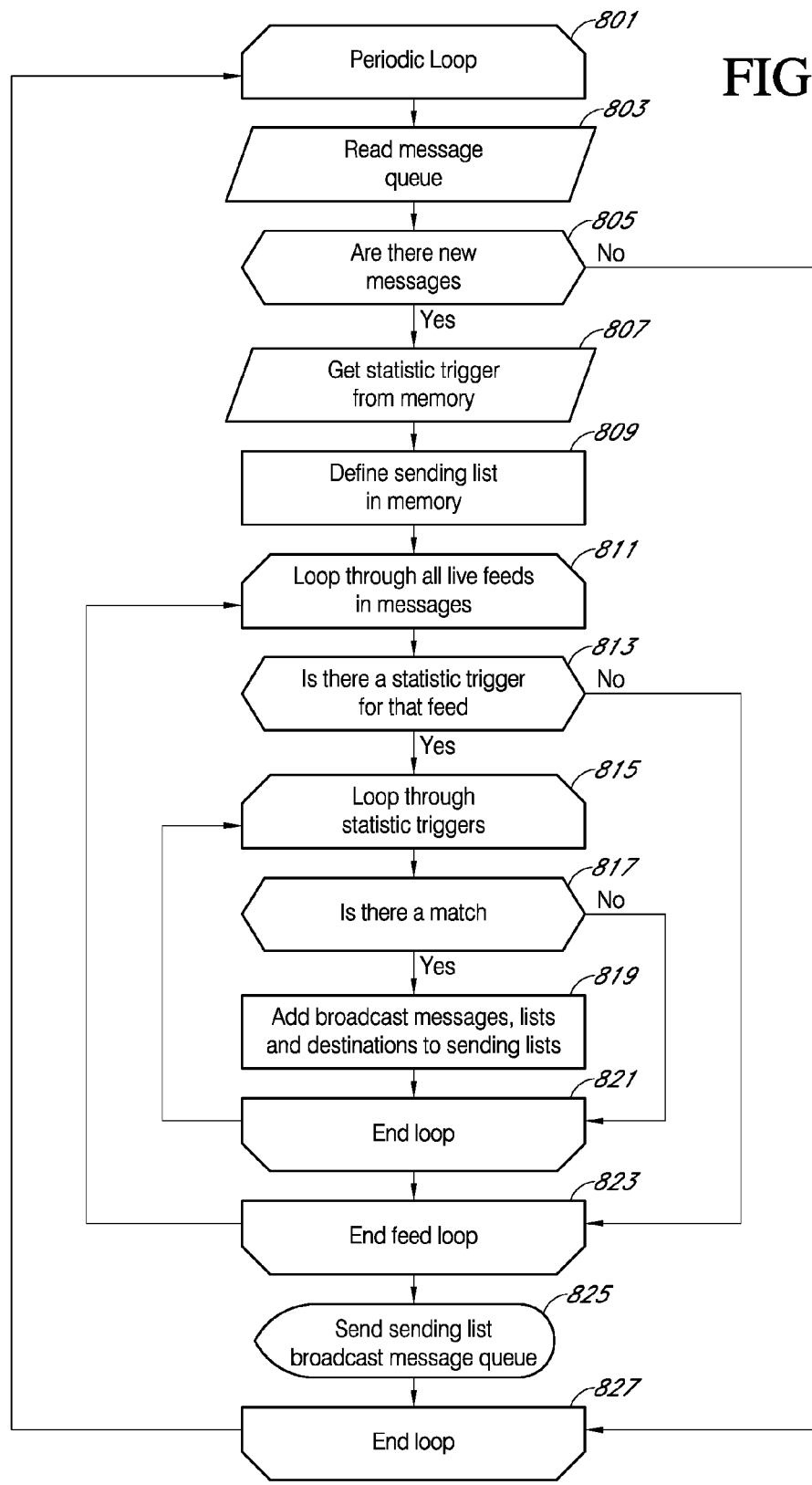
FIG. 8 is a flowchart for an example process for detecting satisfaction of sports statistic triggers.
Figure 9:
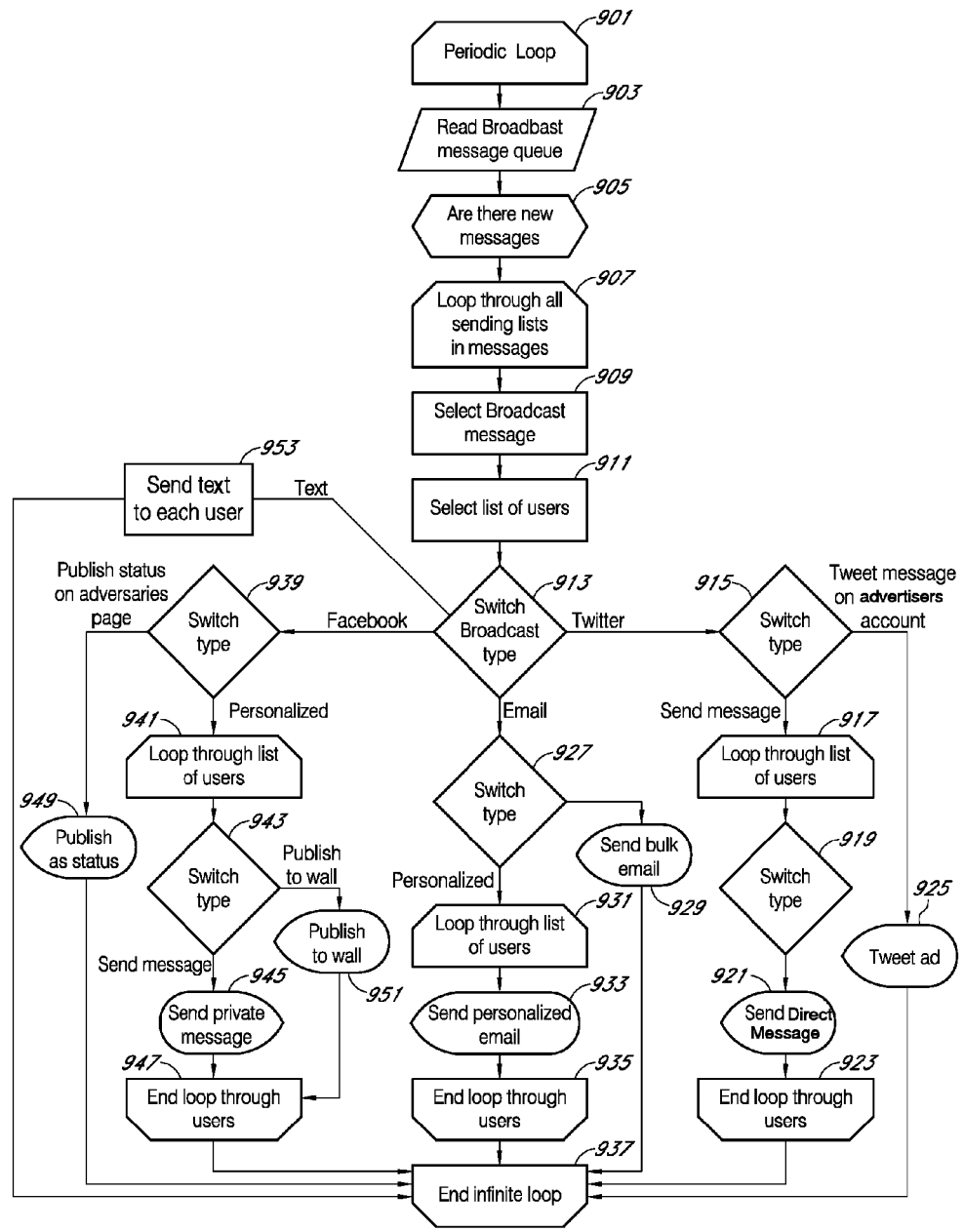
FIG. 9 is a flowchart for an example process for broadcasting a triggered or untriggered message.

Referring now to FIG. 7, FIG. 7 is focused on the methods, steps, or processes that a computer program may take and some embodiments thereof. These steps or processes are not limited to the specific processes shown in FIG. 1, instead it may be a single process that executes all the steps described herein or it may be broken out into multiple programs or processes. Nevertheless, FIG. 7 through FIG. 9 illustrate some overall concepts that may be used by a computer program in some embodiments to detect sports statistics events and trigger broadcast messages therefrom. Specifically, FIG. 7 focuses on preparing the database of sports teams, lineups, rosters, and events for analysis and comparison with the statistic triggers prior to the analysis of the statistic triggers.

For example, in block 701, there may be a periodic loop comprising the following. In block 702, enable sports may be read from a database or data store. For example, if only soccer, NHL, football, and baseball are enabled sports then these would be all the sports where lineups, rosters, and schedules need to be downloaded. For each enabled sport in box 703, the lineups and roster feeds may be downloaded from a third party sport statistics source, such as the links indicated in the configuration file, which may then provide data in block 705 to store and analyze the lineups for each team in block 706. Once this link is completed, then each team in the database for all the enabled sports would have a complete lineup.

In which case, in block 708, the statistics triggers could be read from database and saved to a shared memory for easy access, such as in a data cache. At which point, the periodic loop may start over in block 710 or finish. The route may be run, for example, once a day. This long time frame is because lineups infrequently change and may only need to be downloaded once a day, once an hour, or once a week. It is not a live game statistic.

Referring now to FIG. 8, FIG. 8 illustrates an embodiment that allows for comparison of statistic triggers to data downloaded about live events, using the method steps described. In block 801 a periodic loop may begin. Such a periodic loop may be executed every 30 seconds in order to detect live, changing data from individual gaming feeds. For example, in block 803, a message queue may comprise the latest feeds for all live games. If there are no latest feeds for all live games, in block 805 there are no new messages and the loop may end or may continue looping back to 801. However, if there are new messages, such as new live feeds for games, then the statistic triggers may be retrieved from memory or database and stored in memory. This memory may be a shared memory. In block 811, each feed may be looped through, and if there is a statistic trigger that matches that feed in block 813 then the method may continue to block 815. However, if there isn't a statistic trigger for that feed, for example, if there are no triggers for any players or teams in a specific match, then that portion of the loop may be skipped down to block 823. If there is a statistic trigger that may apply for a specific match feed, then in block 815 there is a comparison for each statistic trigger. Block 817 detects whether there is a match. If there is a match then that broadcast message is added to a sending list. If at the end of the loop there are, in block 825, definitions of the broadcast messages within the sending list, then that sending list may be sent to the broadcast message queue such as broadcast message queue 51. In which case, a delivery process could process the broadcast messages that are supposed to be sent out.

In another embodiment, the block 801 process subscribes to a message queue and consequently waits for a message that has been published in that particular message queue. For example, the message queue may comprise the latest feeds for all live games. If there are no latest feeds for all live games, in block 801 the process just hangs. However, if there are new messages, such as new live feeds for games, the process is activated and passes to block 807, then the statistic triggers may be retrieved from memory or database and stored in memory. The method would then continue onto block 811, as described above. The benefit of this embodiment, compared to the use of polling code and a periodic loop, is that there is a live message queue. Information or data from the feeds is processed immediately as it arrives, leading to a faster way for messages to get out.

In the embodiment described, in block 819 based on the match of the statistic triggers, if the statistic trigger is satisfied then the broadcast message that is affiliated with that statistic trigger will be appended to a list, and such list will be processed one at a time in block 825 to be added to a message queue to be sent out later. In other words, during this method, a list of satisfied triggers and their respective broadcast messages that then need to be sent out are created.

In some embodiments, there may be a broadcast message that is sent out at the end of the match if a trigger is not satisfied. If that is the case, then the event that can be detected is the match over event, in which case, all triggers that could have applied to that match or game yet were not satisfied, could if configured to do so, broadcast a separate message that indicates that particular trigger was not satisfied. In other words, a broadcast message may be sent indicating, "Sorry the trigger was not met this time, please try again."

Such messages that are affiliated with not satisfying the trigger conditions can be associated in the database with the trigger. These messages can be retrieved when such a message should be sent, such as at the end of a game.

As part of the business model there is a "Remainders" feature. For every campaign, a series of broadcast messages can be sent, a different number of times before the game starts, to users that had subscribed to the campaign. The periodicity of these messages and text is specified when the campaign is created. By default a message is sent 24 hours before the game associated to the campaign starts. This is used to keep subscribers engaged with the system and be aware of their offers and subscriptions. The remainders use the same delivery channel shown in FIG. 8.

Additionally, the system provides the ability to the operator of the system to send messages to all subscribers that are subscribed to a campaign. This is also used to keep the subscribers engaged with the system and inform them of changes in the games, schedule, lineups, and so forth. For example, if a campaign is created for a player and that player is injured before the game, a message can be sent to all subscribers informing them of that fact. This feature also uses the process described on FIG. 8.

Referring now to FIG. 9, FIG. 9 illustrates one example method for sending out broadcast messages of different types using different mediums. Unlike the example in FIGS. 1 and 6, this method simply describes the step that could also be taken in another embodiment to provide messaging using various channels. For example, in 901, there's a periodic loop that may read a broadcast message queue in block 903. If there are no messages according to block 905, then a loop may be begun that loops through all the messages to be sent in block 907. In block 909, a specific broadcast message is selected to be sent out, and in block 911, users are selected. This may be done by reading a configuration indicating that distribution lists with specific identifiers may be used in order to send out this broadcast message. Such a configuration may be setup by the user of a system, for example, the user of the system may indicate that for satisfied triggers a text message may be sent out using list A, whereas an email message may be sent out using list B if a trigger was not satisfied at the end of a game. Thus, in block 911 there may be a selection of a different list of users depending on the type of message sent. In block 913 there may be a switch or case statement that, depending on the type of selected medium for distribution, may operate differently. For example, if the broadcast is configured to be a text message in block 953, the text message may be sent to each user using a third party API, or a first party interface with the mobile phone system, or an interface with any other mobile messaging platform such as iMessage. If the broadcast message indicates using a Facebook type of interface or channel, then in block 939 if the broadcast may be configured only to publish the status on a web page then in block 949 that may be done. However, if the message is personalized then you could loop through a distribution list of users and publish to each person's wall in block 951 or send a direct message in block 945 based on configuration of the desired broadcast. Once all direct messages all publishes have been completed in block 947, the loop may end for that specific broadcast message to go out.

Returning back to 913, if the broadcast message is configured to be sent via email then in block 927, a bulk mail could be sent based on a configuration indicated by the user. Bulk mail could be sent via block 929. Alternatively, 931 could loop through a list of users and each user would be sent a personalized, individualized email, such as in block 933. The personalized, individualized email such as in block 933 may have inserted into the email the recipient's name and other personal information that may have been collected. Thus, the actual broadcast message itself may only be a template, and the process as described herein may fill it out with the appropriate personal contact information.

As another example, if the broadcast message was configured by the user to be sent via Twitter, then in block 915 there may be a section based on the configuration by the user to tweet the messages using the advertisers' account on a specific account as illustrated in block 925 or send a twitter direct message as illustrated on block 921. In some embodiments, there may be block 917 and block 919 which may loop through the list of users to send a direct message to based on a distribution list. At the end of the list, block 923 will stop the loop.

Figure 10:
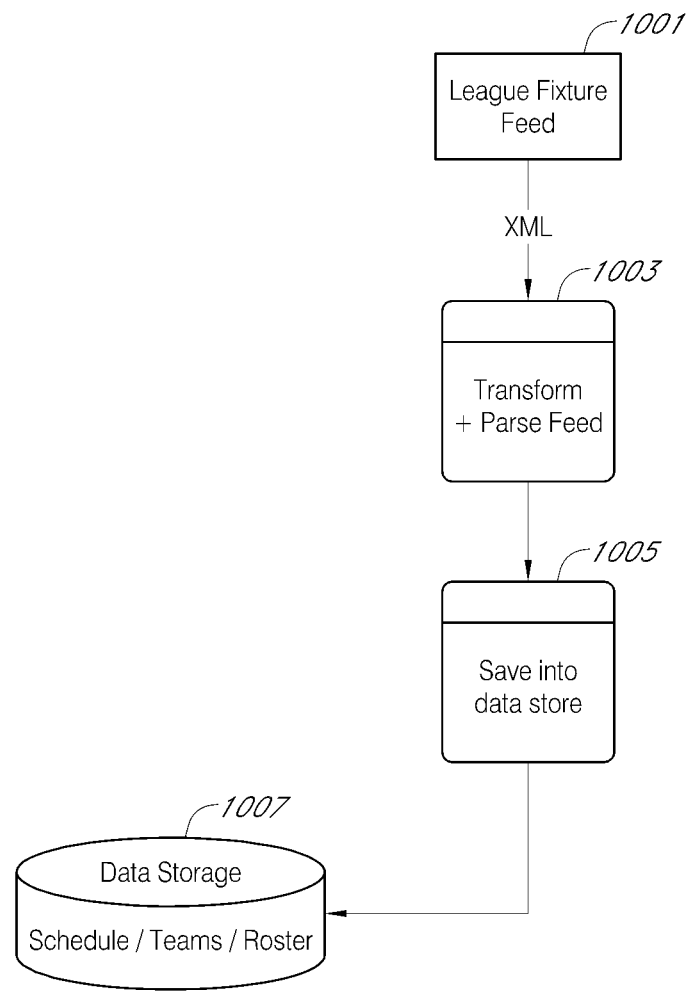
FIG. 10 is a flowchart for an example process for preparing a backend data storage for sports statistic trigger processing and preparation of new triggers.

Referring now to FIG. 10, FIG. 10 describes the process that may take place in order to download league fixtures, which also could be referred to as league schedules, and saving them into a database. These fixtures may comprise a schedule, the sports teams, a roster. The fixtures may also comprise any static information that is not a game feed, such as information that has to do with a sporting league team's players, team locations such as what stadium they play at, what players are on each team, what players are in the starting lineup, the date and time for each game, etc. Typically, the league fixture feeds 1001 can come in a variety of forms and can be downloadable from a third party statistics website in XML, as an example. Then, the processes described herein may read the fixture feeds, extract, and parse the data in order to determine information relating to teams and rosters, including the name of each player, their position, what the league schedule is, when each match occurs, what teams are involved in each match, and what players are in which lineup for each team. Thus, the processes can determine which players are involved with each match, etc. Once this data is parsed, it is then put into a computer readable format and stored into data storage 1007 for access by processes that determine whether during a live game event a statistic trigger has been satisfied. Such a data storage 1007 may be in a SQL format, in structured data files in SQLite, in a hierarchical database, or in flat files. In one embodiment, as described in FIG. 2, MySQL can be used for storage of the schedules, players, teams, and related data for each within a MySQL database.

The methods and systems described herein are based on having statistic triggers in a database that can be read and determined whether they can match live data changes from ongoing live data feeds of sporting events. So far, the exemplary embodiments describe how to create a statistic trigger using an online website. However, as one skilled in the art would recognize, a website is not necessary and instead other input mechanisms may be used in order to create statistic triggers. For example, a mobile application may be used instead of a website in order to input data into the system that represents a statistic trigger, that can then be used to, if the conditions in a live match permit, broadcast a message on one or more various channels.

Figure 11:
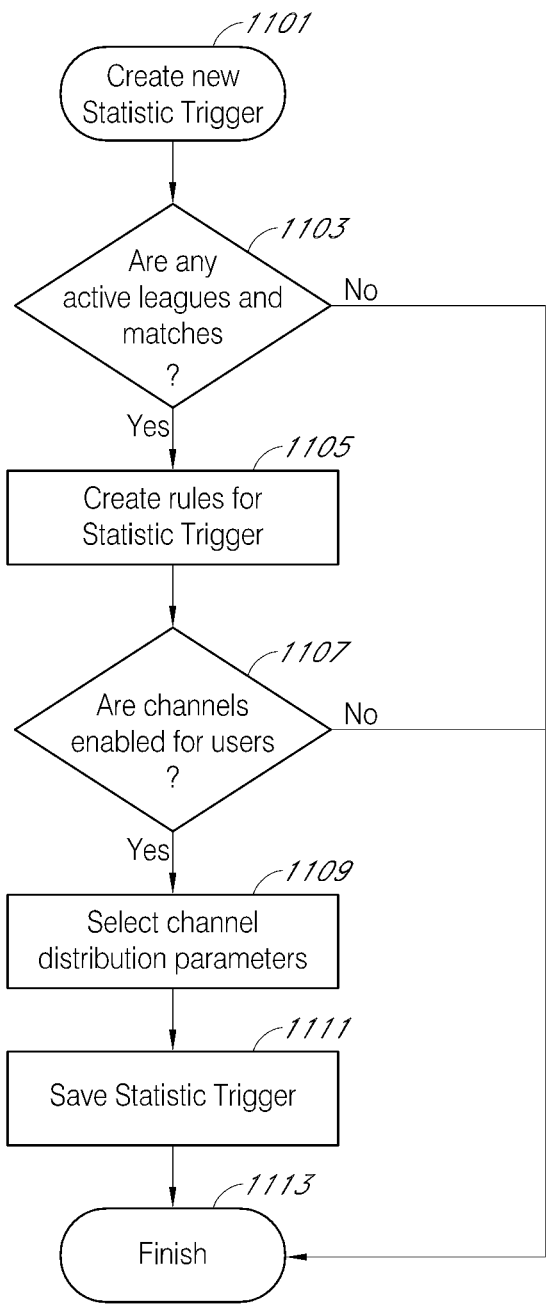
FIG. 11 is a flowchart for an example process for selection, preparation and creation of a sports statistic trigger and related parameter data.
Figure 12:
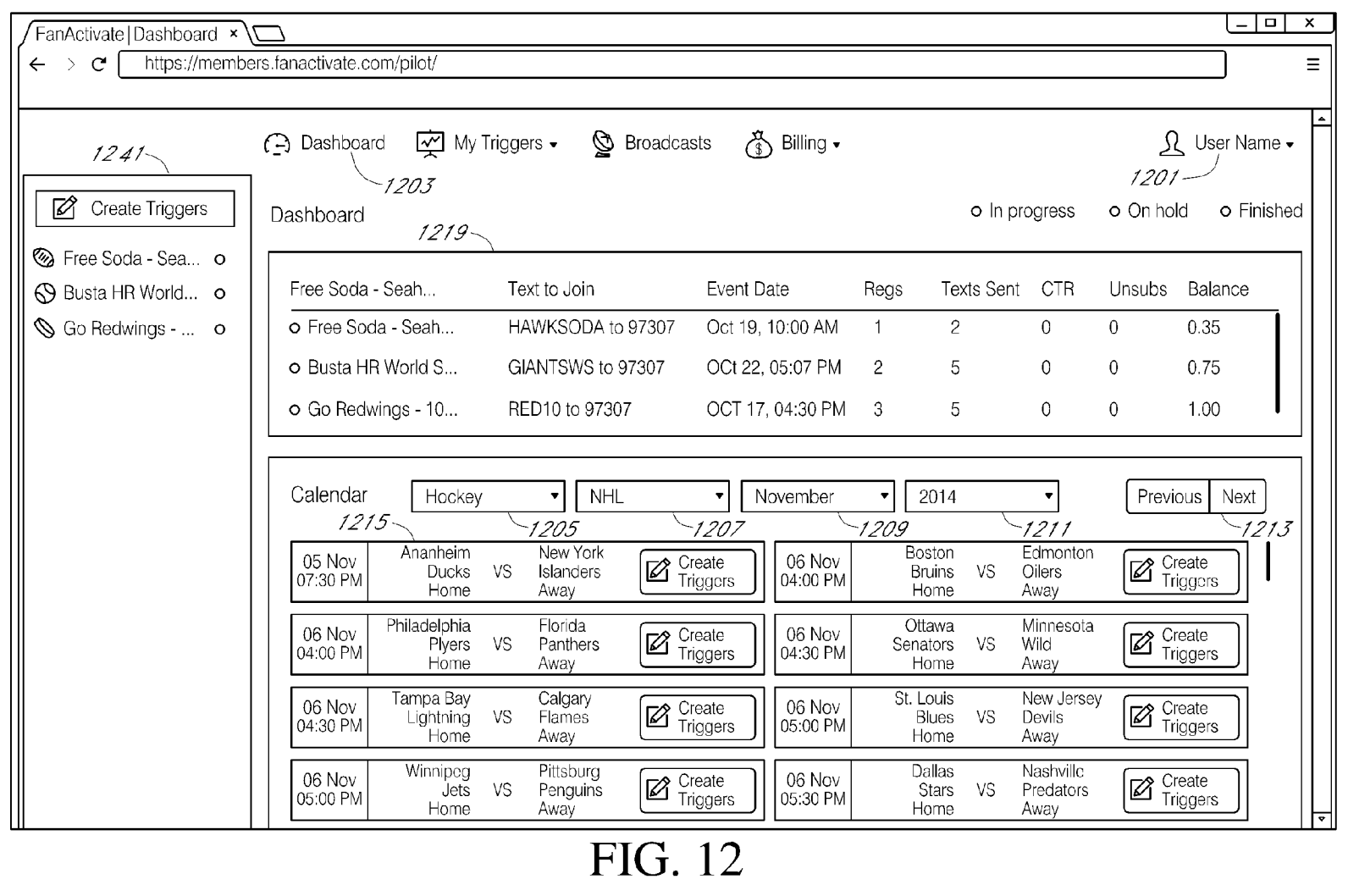

For example, in FIG. 11, there is an illustrated example of a computerized method for creating a new statistic trigger. A user in a web interface may select a user interface option to create a new statistic trigger. As is normal in web-based applications, such selections through the web by a user results in data being formatted and sent by the client web browser to the back-end system for processing. For example, in block 1101, after the user selects to create new statistic trigger, the backing system detects whether there are any active leagues and matches upcoming. If there are not any active leagues or matches upcoming, then the process may finish and indicate to the user via a webpage that there are no upcoming leagues or matches. Otherwise, the user may be presented a screen to create a trigger for various events. In block 1105 the user may, via a web-based form or interactive dynamic web-based form such as one that could use Ajax, configure various statistic trigger parameters for a new statistic trigger. For example, with reference to FIGS. 12 and 13, button 1241 may be selected in FIG. 12 to create a statistic trigger analogous to block 1101. Various other buttons could also create a statistic trigger. For example, each event that is listed in block 1215 may also create a statistic trigger for that specific sporting event.

In block 1105, the parameters for a statistic trigger may be presented to the user and, upon submission by the user, sent back to the system to create the rules for a statistic trigger. For example, in FIG. 13*a* form space 1301, a trigger name may be supplied. In 1303, a text to join keyword may be supplied for the trigger, for example using text to join, "PIZZA", 113 may for a text/SMS-based broadcast message be the key for a subscriber to subscribe to the trigger broadcast message. As described above previously, a user may text such keyword to a specific number to subscribe to a specific trigger and may, in some embodiments, be required to confirm their subscription via text as well. This can be done by sending a user a text message that must be responded to via text in order to confirm subscription.

In form space 1305, a selection of the type of sport may be allowed. Based on the selection of type of sport, various leagues may be selected. Ajax or Javascript can be used to present to the user for selection of a very specific league. For example, in Soccer the Premier League is one such type of soccer league. Based on the specific league selected, a number of matches may be presented. For example, in FIG. 13*a*, the match selected in the pull-down menu 1309 is for Crystal Palace versus Chelsea. The user may then select for the trigger whether the trigger is for a team or player. For example, in FIG. 13*a*, 1311 sets a team for the trigger. In form space 1313, the specific team, which could be Chelsea or Crystal Palace, is selected. In form space 1315, the specific type of trigger is selected. For example, it could be: the amount of points a user scores or a player scores; the amount of points a team scores if it is a team-based trigger; or if it is a team-based trigger, whether the team wins the game. For example, here in the figure, Chelsea must win the game in order for the trigger to be satisfied. In block 1317, in one option, a trigger continuation option may be selected. For example, if Chelsea does not win the game first-selected by the user, then if the trigger continuation selection indicates yes, then the next game which may be selected in form space 1319, the same trigger may apply with Chelsea attempting to win the next Chelsea versus Crystal Palace match. Advantageously, this may provide a way for a user who wishes to set up a statistic trigger broadcast message to have that statistic trigger broadcast message applied to more than one or multiple games. The statistic trigger broadcast message would not be restricted to a single game, and there would be no need to create a new trigger for each game.

In some embodiments, a user may select that the trigger may either survive indefinitely until the trigger has been satisfied, in which case the trigger no longer exists or the trigger will no longer trigger any broadcast messages. Or in another embodiment, a user may select that the trigger will survive and be repeated on any amount of games indefinitely or for a set number of games, regardless of whether the trigger is met.

In selecting a trigger, for example, in block 1315, some triggers may have a configurable score portion. In this case, if a trigger is for a specific player scoring a certain amount of points, then the amount of points may be enterable in a user interface form space—for example, to the right of form space 1315.

In some embodiments, a trigger may span multiple games. If that is the case, then you may have multiple triggers and multiple games and teams being selected. For example, if the trigger is that Chelsea wins 5 games in a row, then 5 specific games may be selected. Or the trigger may itself be indicated as winning the 5 next games. Alternatively, if a specific baseball player is selected and a specific player trigger is setup for the player to have at least one hit in at least 10 games (i.e., a streak of 10 games that has a hit), then no specific event match may be required to be selected. Instead, only the team or player within a certain event type and a certain league may need to be selected. In which case, the system may automatically populate specific triggers for the various games. Whether the statistic trigger is satisfied may then be determined based on the status of the current game that is being analyzed and the previous status of previous games, rather than just the live data from a specific game. In this manner, streaks may be used as a trigger.

In addition, multiple triggers may be combined together in order to create a statistic trigger. For example, in the situation of a double-double in basketball, then a performance in which a player accumulates a double-digit total in two of five statistic categories of points, rebounds, assists, steals, and blocked shots in a game of basketball may be the trigger. This requires tracking various statistics about a player during a live game and determining whether two of the statistics are each greater than ten, at which case the statistic trigger would trigger the broadcast message. Thus, the systems herein support multiple simultaneous triggers that must be met in parallel in order to trigger a broadcast message. Such a mechanism requires the use of shared memory to store trigger statistics so that an updated version of all statistics exists in the shared memory and is accessible by all processes analyzing events generated by live gaming feeds, such that any one specific process has the most up to date data about a game and may make determinations using multiple steps to see if a trigger has been satisfied.

Figure 13A:
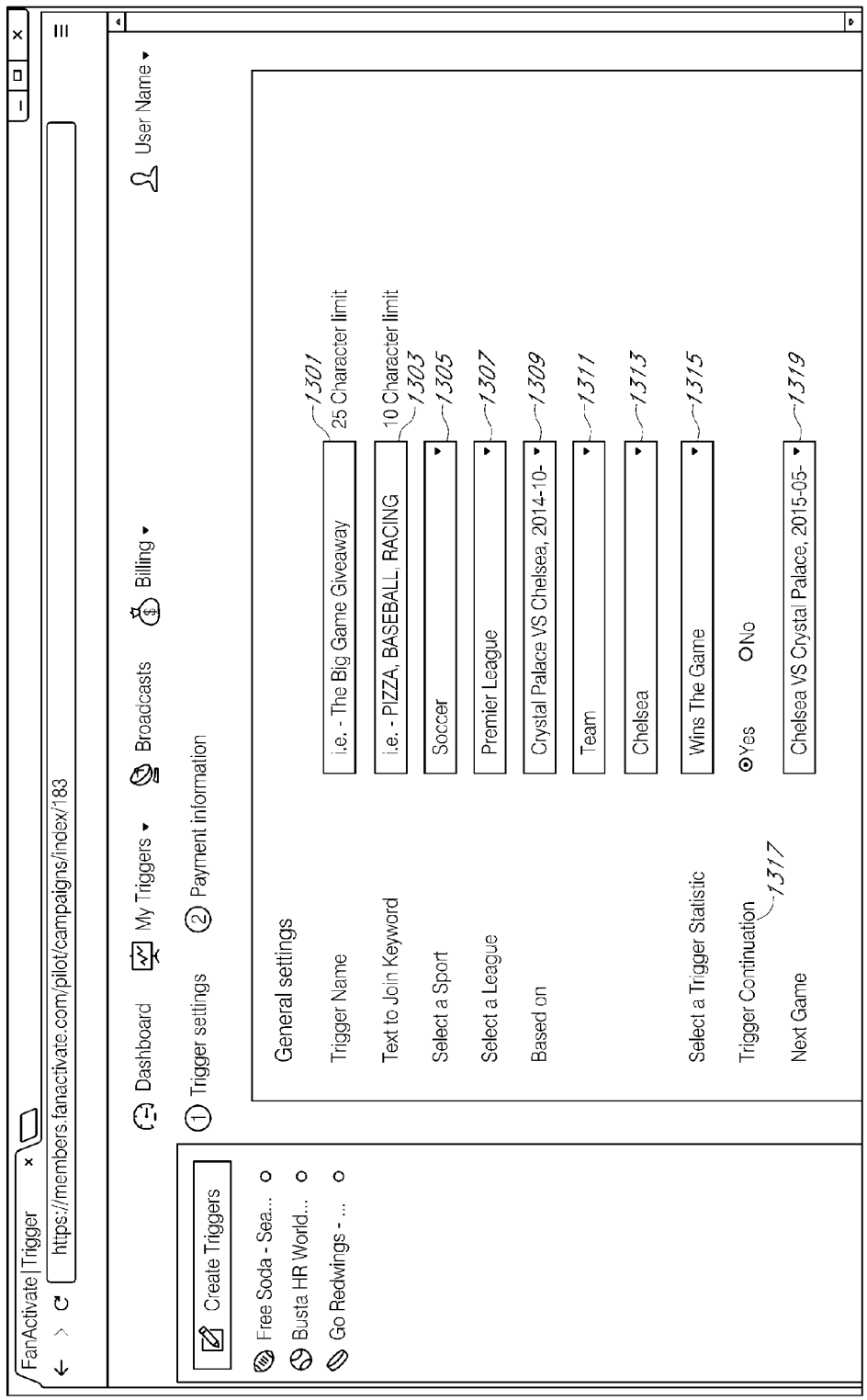
FIG. 13A is an example user interface for setup of a sports statistic trigger.

Not shown in FIG. 13*a* is a selection of specific channels to distribute a message on. However, the user interface in FIG. 13*a* may have a selection of one or more distribution channels to send a broadcast message if a trigger is satisfied. For example, it may have a selection for a Facebook mechanism, an Instagram mechanism, a Twitter mechanism, an email mechanism or a text/SMS messaging mechanism. In some embodiments, the user interface may also allow the upload of distribution lists for each specific mechanism, or as described above, allow subscription via email, text, or web, etc. for a specific broadcast message mechanism which may be selectable or configurable by a user. For example, a subscriber may want to receive a text-based message and not an email-based message for a satisfy trigger, whereas the user may want to select that they would like an email-based message for an unsatisfied trigger.

Figure 13B:
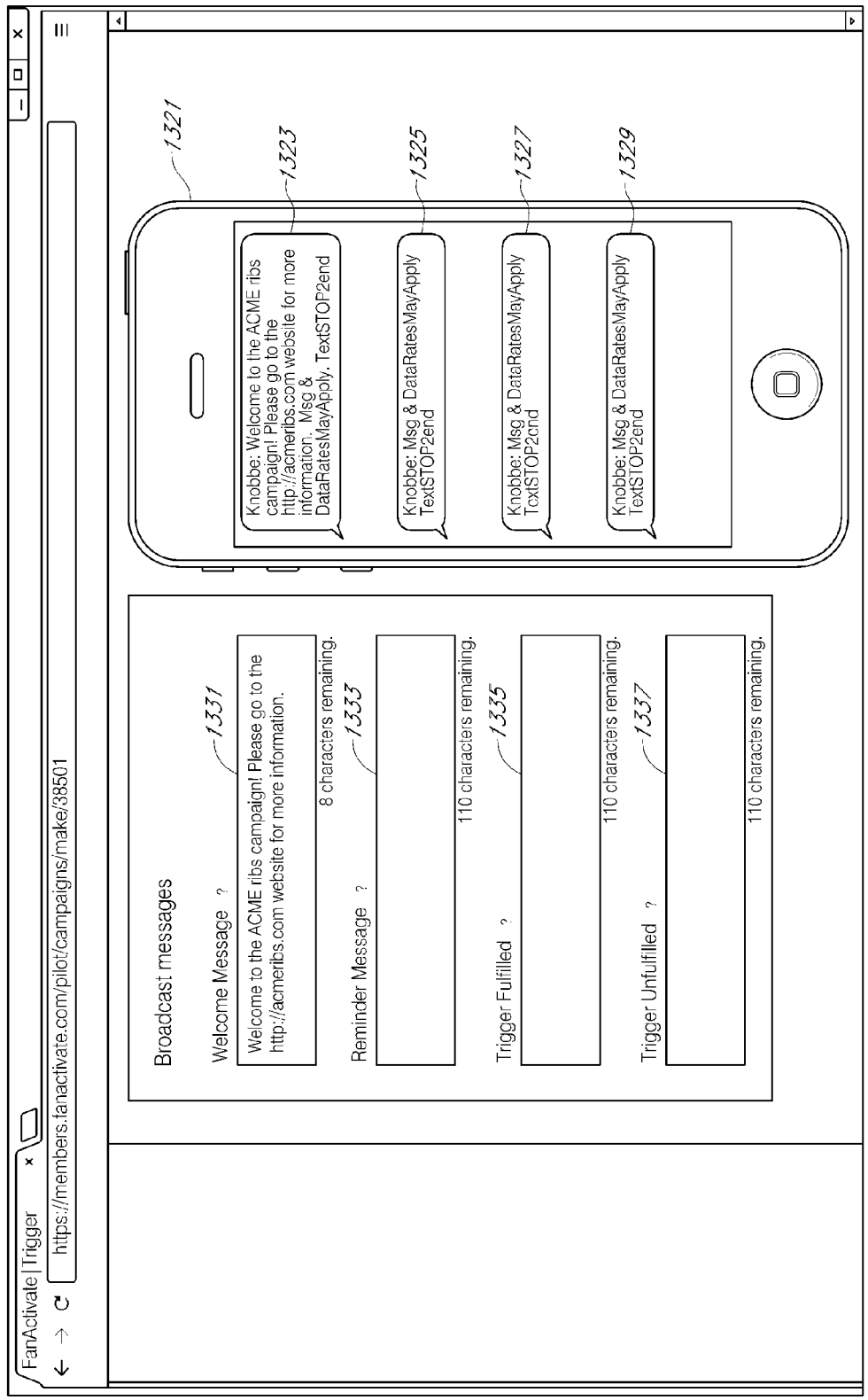
FIG. 13B is an additional example user interface for setup of a sports statistic trigger.

FIG. 13*b* illustrates a mobile virtual user interface that dynamically displays example broadcast messages that may be sent to one or more users depending upon various criteria. For example, a user who would like to set up a welcome message for a statistic trigger subscription request may type in their information in form space 1331. In this case, the data that is typed in form space 1331 will then be displayed as it would actually be sent to a user in a text message within the mobile user interface. This display is updated dynamically. Thus, as soon as the user types in "Please go to the acmeribs.com website for more information", that text is immediately live, in real-time, displayed within the example text message 1323 in the mobile test user interface. Notice that additions to the text exist, such as the words "Knobbe" at the beginning of the text message which indicates that it is from a user affiliated with Knobbe. The text at the end of the messages may be required by a regulatory scheme to indicate that message and data rates may apply and allow for a method of unsubscribing from the subscription list, such as described herein, texting "STOP" to end. Likewise a reminder message 1333, a trigger fulfill message 1335 which is generally referred to as broadcast messages herein, and trigger unfulfilled message 1337 may be typed into the mobile user interface and updated in real time, dynamically. The updated messages can be previewed in the example reminder message 1325, the example trigger fulfilled message 1327, and the example trigger unfulfilled message 1337. When the entire form is submitted by the user all of the selections about a trigger and the messages associated therewith may be transmitted to the system for storage in a database in association with the trigger and various subscription lists.

In one embodiment, the mobile virtual user interface may have buttons alongside the form spaces for entering welcome message 1331, reminder message 1333, trigger fulfilled message 1335, and trigger unfulfilled message 1337. The buttons may allow for the uploading of an image file, which may be inserted into the message or sent in lieu of the message.

In one embodiment, the mobile virtual user interface may have buttons in the space below the form spaces for entering the various broadcast messages. One button may be to save the campaign, allowing the user to save the messages that have been input into the form spaces, such as those in 1331, 1333, 1335, and 1337. This will allow the user to save the progress they have made in creating the messages, or if the user is finished drafting the messages, save the messages into the system for broadcast later on. Another button may be a cancel button, which will allow the user to cancel any messages that have been entered into the form spaces, such as those in 1331, 1333, 1335, and 1337. The user can then start over with drafting messages or cancel the campaign entirely.

In one embodiment, in block 1331 if the URL is typed within one of the messages such as the welcome message, reminder message, trigger fulfilled message, or trigger unfulfilled message then that URL may be shortened to a smaller URL automatically and may be displayed in the right hand text mobile interface as a shortened URL. This short URL may be useful and advantageous in order to save space in the text message. The shortening may be automatically performed for a user using the system to broadcast messages based on a trigger. In addition the short URL can be used to track user's 'clicks' and get information of what users accessed the links sent and some other information like user's IP address, time and date, etc. This is possible because the created short URL points to a server that is part of the system, where the mapping between the short URL and the advertiser's URL is resolved.

FIGS. 13b and 13a may be on the same webpage or on the subsequent webpages. In either event, all the data from FIGS. 13a and 13b may be considered data associated with a particular trigger or a combo trigger, and may be considered parameters therefore. Such parameters and associations may be stored in data storage accessible by the system and may also be cached in shared memory. Or, the shared memory may be considered the data storage itself. In the event that processes described herein detect events and detect whether a trigger has been satisfied, the processes also have access to the trigger parameters in order to take appropriate action when the trigger is satisfied and in order to determine whether the trigger is satisfied.

Returning back to FIG. 11, in block 1107 there may be multiple channels enabled for a specific user. For example, there may already be distribution lists and channels for Facebook, or Twitter, or Instagram, for a specific user, and if those are enabled then a channel for a specific trigger may be selected and various user lists may be uploaded in block 1109. On the other hand, if there are no channels available to the user then the default channel of a text or SMS message may be used instead. In either event, after all of the trigger parameters have been sent to the system and received by the system over the internet via either a web browser or mobile application, etc., all the trigger data in block 1111 is stored to the data storage system for future access directly by a process that may detect events and/or analyze whether a trigger has been satisfied for a given live game event. Or the trigger data may be moved into cache for such easier access by such processes.

Returning now to FIG. 12, an example user interface is illustrated. Various menus are provided at the top of the web page. For example a dashboard, a list of triggers, and information about broadcasts or billing can be found in menu bar 1203. Information provided in the dashboard may be seen in area 1219 in the user interface. For example, each statistic trigger that is associated with the user, where that user wants to create a trigger that is triggerable based on a live sporting event, can be referred to in a scrollable block 1219. For example, each trigger or campaign may have a name, for example, "Free Soda", "Busta HR World", "Go Redwings", etc. The text to join keys can also be listed, such as "HAWKSODA", "GIANTSWS" or "RED10". The date of the upcoming or past event, such as the game that the key applies to, may be listed. The amount of registrations or the amount of people subscribed to receive broadcasts based on a statistic trigger may be listed, the amount of texts sent either based on a successful broadcast or for the purposes of gaining subscribers to a trigger, and other related data, may be listed. For example, a balance may be listed in association with the trigger or campaign. Such a balance may indicate the amount of charges accrued for sending out such broadcast messages in association with either subscription to the service, unfulfilled triggers, or fulfilled triggers.

Below the dashboard, a schedule of upcoming games may be viewed based on a number of factors. For example, it may list all games or using interface mechanisms 1205, 1207, 1209, and 1211. The type of sport may be filtered, the league may be filtered, the month and year may also be filters, thus narrowing down what is displayed within the user interface to create a statistic trigger. For example, in 1215 each individual game may have a 'create a trigger' button. Thus, when moving on to user interface in 13a, it may pre-calculate portions of the trigger configuration such as the sporting event type, the league, the specific game and teams involved in that game. Alternatively, a new trigger or campaign may be created using a separate button such as button 1241. The user interface may be customized based on a specific user. For example, the current user who is logged in, and has security privileges for creating statistic triggers for that specific user and account, may be listed in the upper right hand corner. For example, by thumbing down user interface element 1201, the user may provide more information in their profile, provide billing information and contact information, etc. or may change their password, sign in/sign out of the service, etc.

Referring to FIGS. 13a and 13b, these represent examples user interfaces for setting up a trigger and displaying information of how text messages for a trigger may be viewed, such as in the text mobile user interface 1321 with test mobile messages 1323, 1325, 1327, 1329 being displayed dynamically based on data entered in fields 1331, 1333, 1335, and 1337 respectively. Thus, the user may be able to setup a trigger using the fields in FIG. 13a and setup broadcast messages in the field that is represented in FIG. 13b, including information on how to text or join the campaign/trigger and what messages a user that has subscribed, or is subscribing, to the trigger may view.

In one embodiment, there may be options for the preview of the messages written into 1331, 1333, 1335, 1337 to be displayed in configurations for viewing other than the configurations of the test messages displayed in 1323, 1325, 1327, 1329. For example, there may be radio buttons above the panel for entering broadcast messages 1331, 1333, 1335, and 1337 that allow for the preview output to be either "Smartphone" or "Social Networks." If "Smartphone" is selected, then the previewed test messages can be like the ones shown in 1323, 1325, 1327, and 1329 of the figure. However, if "Social Networks" is selected, options may be provided the user to preview the messages as they would be displayed in various social media websites. For example, upon the selecting of "Social Networks", text mobile user interface 1321 may change to a preview table with an array of buttons or icons corresponding to Facebook, Instagram, Twitter, and so forth, for each message 1331, 1333, 1335, and 1337 being entered. So by clicking the Facebook button that corresponds to welcome message 1331, a pop-up window appear may appear that provides a preview of how the content of welcome message 1331 would look when published to the Facebook site. The Instagram and Twitter buttons could operate the same way and provide previews of how the content in the corresponding messages would be displayed on those sites.

In one embodiment, there may be an option for the preview of the messages in various smart phone formats. For example, as long as the preview output selected is "Smartphone", there may be radio buttons above text mobile user interface 1321 that allow for a selection so that the text may be previewed in "SMS" or "WhatsApp". By alternatively selecting the option to preview in "WhatsApp", the messages in 1323, 1325, 1327, 1329 may be previewed in the format they would be displayed as in the messaging application WhatsApp. If the option to preview in "SMS" is selected, along with the option to preview in a "Smartphone", then the content of the messages would be displayed as they currently are in test mobile messages 1323, 1325, 1327, and 1329.

Other user interfaces may also be displayed in a web application that manages subscriptions and may advantageously report statistics and analytics about the availability and use of the various triggers. For example, in FIG. 14, the "Free Soda—Seahawks" trigger may be displayed. In box 1481, the trigger may be edited which may return the user to a configuration user interface similar to FIG. 13b and FIG. 13a. In FIG. 14, various settings and statistics are displayed in regards to the trigger. For example, in 1301 the name of the trigger is displayed, the text to join keyword is displayed in field 1303, the sport is displayed in 1305, the trigger selected game is displayed in 1309, the actual trigger such as a specific team performing a specific event or action, such as winning the game, in 1315 may be displayed. Alternatively, the actual trigger may be a player when he's reached a certain score, which is configurable and displayed within FIG. 14 in other embodiments. Likewise, whether the trigger may continue on to a next game is configured in fields 1317 and 1319 respectively. Similarly, as in the FIGS. 13a and 13b, the various promotional broadcast messages may also be displayed. Thus, in FIG. 14, a quick information of the configuration of each individual trigger may be displayed. Other triggers may be selected for display on the left hand side of the user interface. For example, a user could click on the "Busta HR World" text and would receive a similar configuration for that specific trigger in similar webpage.

Statistics about each statistic trigger may be displayed in the user interface as well. For example, various statistics 1401 may include the number of registrations to a specific trigger, the number of messages sent out to a trigger which may or may not include the welcome messages, the number of click-throughs of a message—for example, if the message has a link that may indicate the number of people who have clicked on a link within a broadcast message, and the amount of money that has been charged based on that trigger—for example, in statistics 1401 under the balance column. Alternatively, the balance column could represent the amount of money left that may be deducted from, based on messages sent in the campaign if each message costs a set amount or a variable amount based on the type of message. In block 1403, the various amount of registrations, messages and click-throughs can be tracked on a graph chart over time based on historical data—an analytic saved in the data storage about messages sent and received, click-through on a broadcast message, and registrations signed up for the campaign. Similarly, the same events can be logged in an activity stream in user interface block 1405. For example, 1407 may display that 4 messages were sent on October $31^{st}$ for a charge of 20¢ which deducted the balance to 20¢. The activity stream 1405 may be a most recent listing of 10, 20, 30, or configurable amount of events, related to that trigger. For example, the activity stream may include: welcome messages sent out, broadcast messages sent out, broadcast messages sent out based on an unfulfilled trigger, etc.

FIG. 15 represents another browser user interface to track transaction history across all statistic triggers. For example, a current balance of money for all statistic triggers 1503 may be recorded in data storage or made to display within the user interface. Whenever a debit or credit is applied to the current balance, that number may be modified within the current database and newly displayed within this user interface. The transaction history may account for all transactions that relate to a debit or credit to the balance. For example, on October $22^{nd}$ in line 1517, there were two SMS messages which may result in a 10¢ debit to the account balance. Whereas for example in 1519, there may have been one subscription signed up which may cost a different amount of debit 25¢ which may be deducted from the account balance. In another example in line 1521, eight Facebook messages may have been sent at a different price—here 10¢ each—which may result in the account balance shown of $224.60 based on the previous account balance of $225.40. For example, on October $17^{th}$ there was a credit to the account of $225.40. In some embodiments, no broadcast messages may be sent out after a user's current account balance goes to zero. However, in some embodiments, there may be a brief time period where a negative balance may be acceptable. In user interface element 1505, a user may click on that element to go to a screen where they may add additional funds such as the $225.40 addition via Visa shown on October $17^{th}$.

Figure 16:
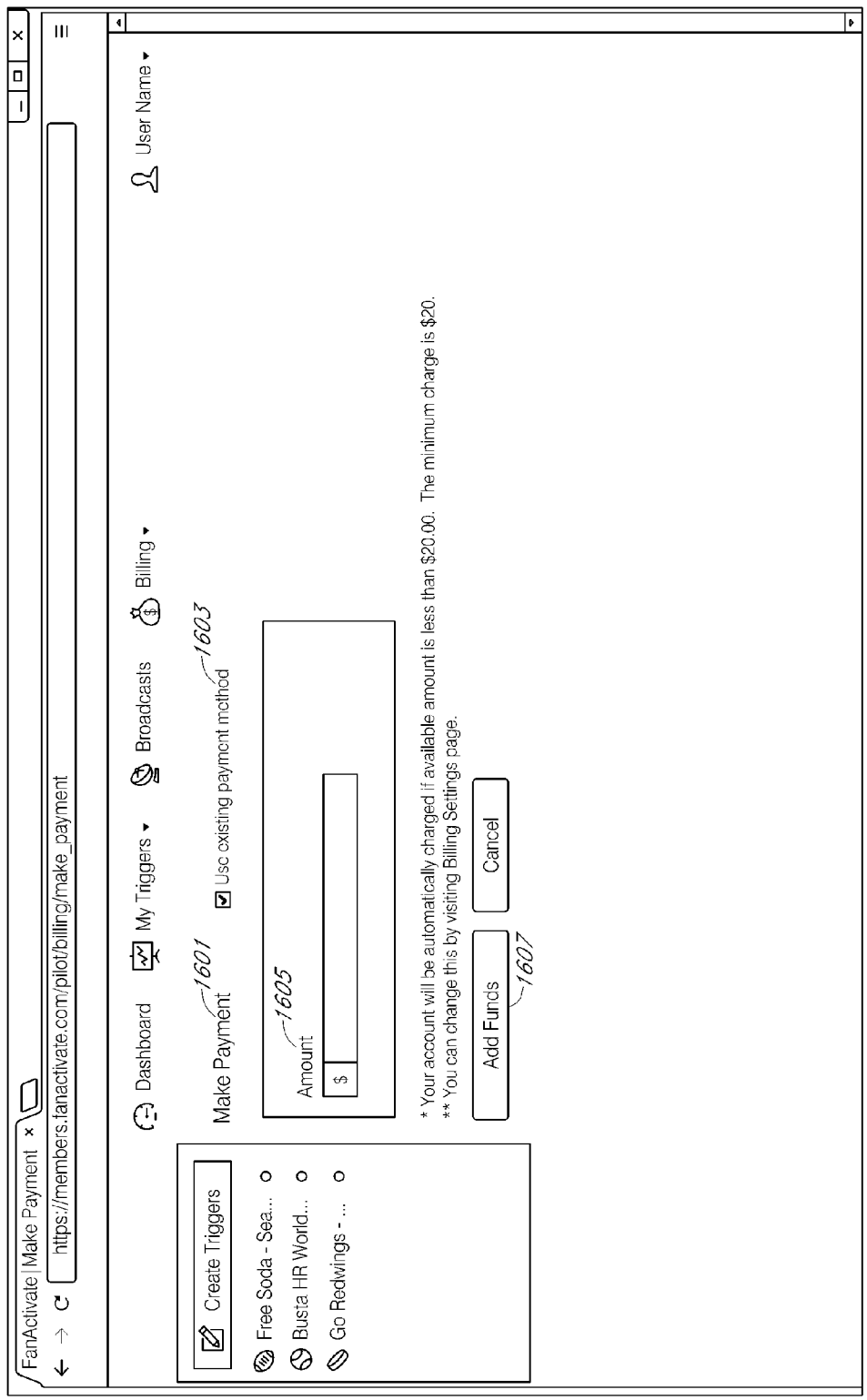
FIG. 16 is an example user interface for adding balance within a sports statistic trigger system.
Figure 17:
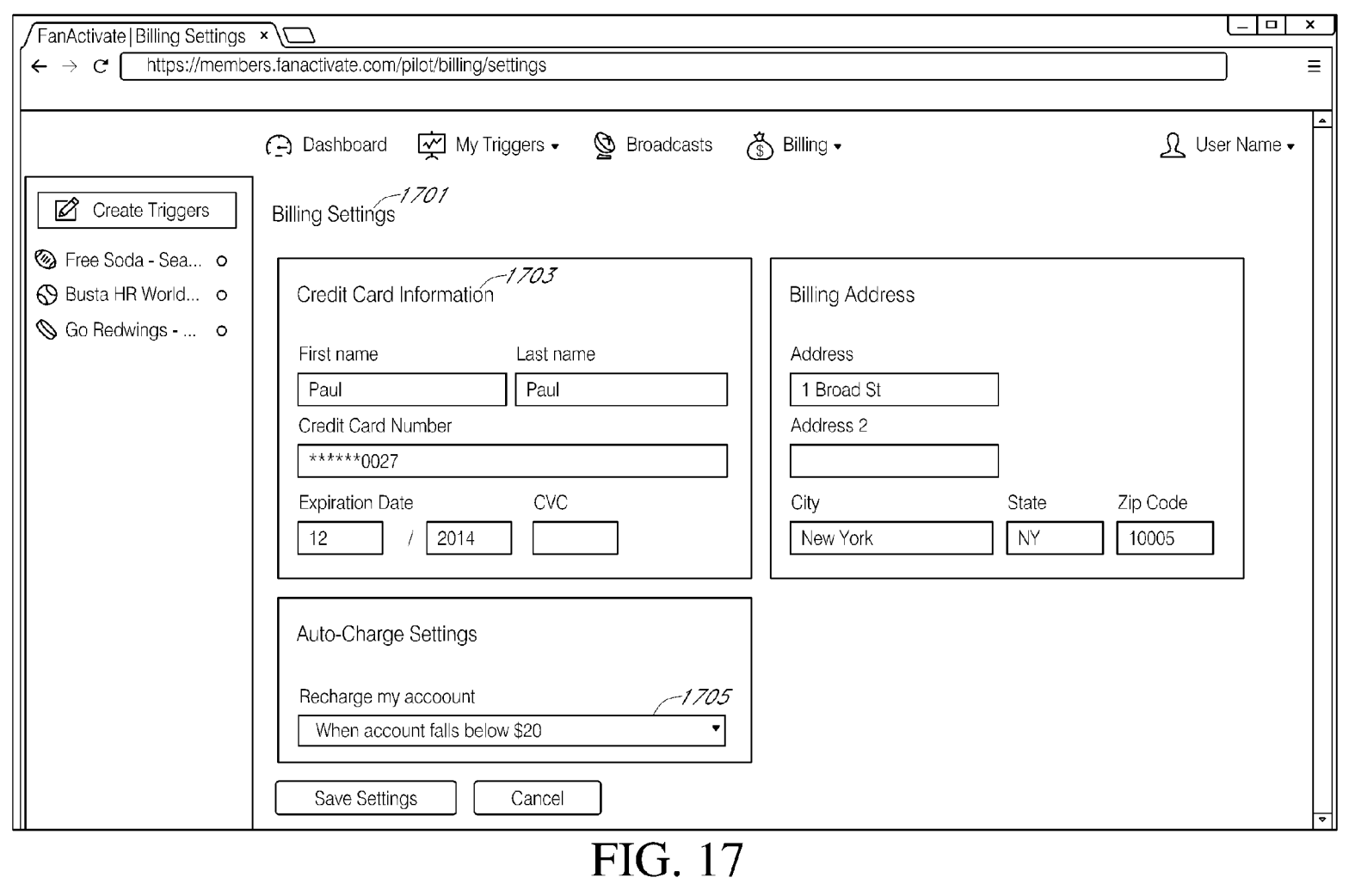

FIG. 16 illustrates a sample method of inserting new funds into an account so that triggers may be deducted from it to broadcast messages. Various other transactions may also occur that have a price associated with it, such as the ones displayed in FIG. 15. For example, a user may insert an amount in box 1605 and click add funds and may use either an existing payment method as indicated in the check box in 1603. Or referring now to FIG. 17, the user may add a new credit card. For example, in user interface element 1703, a new credit may be inserted with new associated credit card information. In block 1705 an auto-charge may be available in block 1705 when an account falls below $20 or a configurable amount. The card is recharged for that amount so that there will always be an available balance for charges for that particular user who is setting up the sports statistic triggers.

According to various embodiments, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 18:
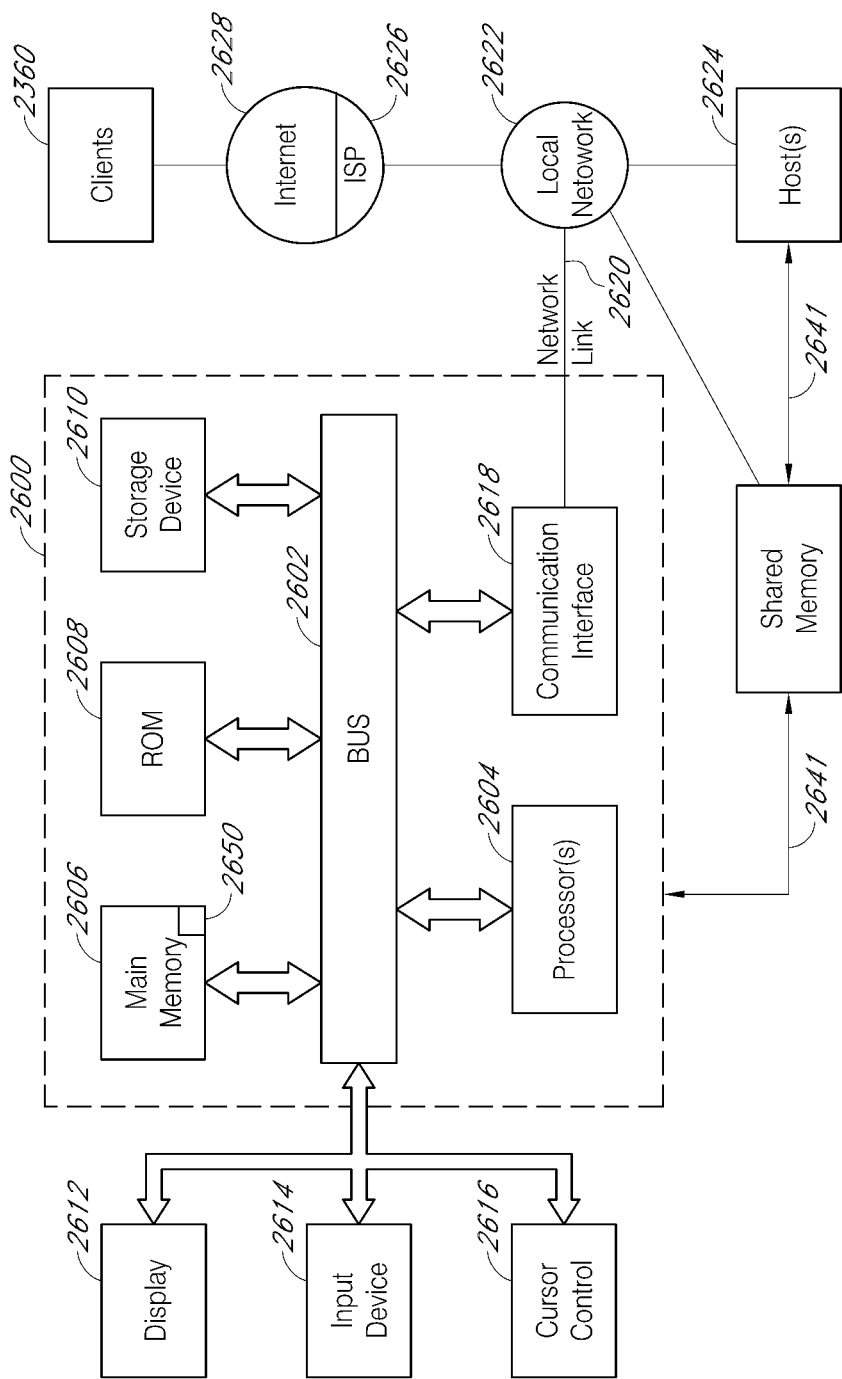
FIG. 18 illustrates a computer system with which various embodiments may be implemented.

For example, FIG. 18 is a block diagram that illustrates a computer system 2600 upon which various embodiments of the invention may be implemented. Computer system 2600 includes a bus 2602 or other communication mechanism for communicating information, and a hardware processor 2604 coupled with bus 2602 for processing information. Hardware processor 2604 may be, for example, a general purpose microprocessor. In various embodiments, one or more of the memory 200, data repository 204, table view 205, view computation unit 206, rendering unit 207, report unit 209, graph model logic 212, custodian interface unit 213, and/or the like, may be implemented on the computer system 2600. For example, the various aspects of the systems described in reference to FIG. 1 may be stored and/or executed by the computer system 2600.

Computer system 2600 also includes a main memory 2606, such as a random access memory (RAM) or other dynamic storage device, coupled to bus 2602 for storing information and instructions to be executed by processor 2604. Main memory 2606 also may be used for storing temporary variables or other intermediate information during execution of instructions to be executed by processor 2604. Such instructions, when stored in non-transitory storage media accessible to processor 2604, render computer system 2600 into a special-purpose machine that is customized to perform the operations specified in the instructions. Main memory may comprise a shared memory, when the shared memory is a memory space in main memory accessible by multiple processes.

Computer system 2600 further includes a read only memory (ROM) 2608 or other static storage device coupled to bus 2602 for storing static information and instructions for processor 2604. A storage device 2610, such as a magnetic disk or optical disk, is provided and coupled to bus 2602 for storing information and instructions.

Computer system 2600 may comprise, or have access to, a separate shared memory 2643. Such access 2641, may be via local memory bus, via local area network, via a storage area network, or the like. The shared memory 2643 may be a logical memory (such as a distributed global address space), which may actually be a distributed shared memory across separate physical memory spaces. Advantageously, each other physical computer system (such as HOST(S) 2624) that may also have access to the same shared memory in order to use multiple separated hardware systems running processes, such as the ones illustrated in FIG. 1, to ensure scalability.

Computer system 2600 may be coupled via bus 2602 to a display 2612, such as a cathode ray tube (CRT), for displaying information to a computer user. An input device 2614, including alphanumeric and other keys, is coupled to bus 2602 for communicating information and command selections to processor 2604. Another type of user input device is cursor control 2616, such as a mouse, a trackball, or cursor direction keys for communicating direction information and command selections to processor 2604 and for controlling cursor movement on display 2612. This input device typically has two degrees of freedom in two axes, a first axis (e.g., x) and a second axis (e.g., y), that allows the device to specify positions in a plane.

Computer system 2600 may implement the techniques described herein using customized hard-wired logic, one or more ASICs or FPGAs, firmware and/or program logic which in combination with the computer system causes or programs computer system 2600 to be a special-purpose machine. According to one embodiment, the techniques herein are performed by computer system 2600 in response to processor 2604 executing one or more sequences of one or more instructions contained in main memory 2606. Such instructions may be read into main memory 2606 from another storage medium, such as storage device 2610. Execution of the sequences of instructions contained in main memory 2606 causes processor 2604 to perform the process steps described herein. In alternative embodiments, hard-wired circuitry may be used in place of or in combination with software instructions.

The term "data storage" or "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 2610. Volatile media includes dynamic memory, such as main memory 2606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge. Such data storage (such as data storage 43) may comprise data files (executable or informational) and/or structures that make up one or more databases.

Storage media is distinct from but may be used in conjunction with transmission media. Transmission media participates in transferring information between storage media. For example, transmission media includes coaxial cables, copper wire and fiber optics, including the wires that comprise bus 2602. Transmission media can also take the form of acoustic or light waves, such as those generated during radio-wave and infra-red data communications.

Various forms of media may be involved in carrying one or more sequences of one or more instructions to processor 2604 for execution. For example, the instructions may initially be carried on a magnetic disk or solid state drive of a remote computer. The remote computer can load the instructions into its dynamic memory and send the instructions over a telephone line using a modem or other network interface (Ethernet card, etc). A modem local to computer system 2600 can receive the data on the telephone line and use an infra-red transmitter to convert the data to an infra-red signal. An infra-red detector can receive the data carried in the infra-red signal and appropriate circuitry can place the data on bus 2602. Bus 2602 carries the data to main memory 2606, from which processor 2604 retrieves and executes the instructions. The instructions received by main memory 2606 may optionally be stored on storage device 2610 either before or after execution by processor 2604.

Computer system 2600 also includes a communication interface 2618 coupled to bus 2602. Communication interface 2618 provides a two-way data communication coupling to a network link 2620 that is connected to a local network 2622. For example, communication interface 2618 may be an integrated services digital network (ISDN) card, cable modem, satellite modem, or a modem to provide a data communication connection to a corresponding type of telephone line. As another example, communication interface 2618 may be a local area network (LAN) card to provide a data communication connection to a compatible LAN. Wireless links may also be implemented. In any such implementation, communication interface 2618 sends and receives electrical, electromagnetic or optical signals that carry digital data streams representing various types of information.

Network link 2620 typically provides data communication through one or more networks to other data devices. For example, network link 2620 may provide a connection through local network 2622 to a host computer 2624 or to data equipment operated by an Internet Service Provider (ISP) 2626. ISP 2626 in turn provides data communication services through the world wide packet data communication network now commonly referred to as the "Internet" 2628. Local network 2622 and Internet 2628 both use electrical, electromagnetic or optical signals that carry digital data streams. The signals through the various networks and the signals on network link 2620 and through communication interface 2618, which carry the digital data to and from computer system 2600, are example forms of transmission media.

Computer system 2600 can send messages and receive data, including program code, through the network(s), network link 2620 and communication interface 2618. In the Internet example, a server 2630 might transmit a requested code for an application program through Internet 2628, ISP 2626, local network 2622 and communication interface 2618.

The received code may be executed by processor 2604 as it is received, and/or stored in storage device 2610, or other non-volatile storage for later execution.

10.0 Additional Embodiments

Some embodiments have been described above in reference to table generations. However, it is to be understood that the system may similarly generate charts, graphs, and/or other types of information display via graph traversal.

Advantageously, according to various embodiments the system may determine across multiple computing devices, whether or not specific sporting events may occur in real-time and in large quantity. For example, given the number of sporting events occurring simultaneously, the computing system may determine changes in sporting data on the scale of 10, 100, 1000, or 10,000s every thirty seconds, or other periodic interval (1 second, 10 seconds, 1 minute, 5 minutes, etc.) Thus, advantageously, in various embodiments, large amounts of data are automatically and dynamically calculated interactively in response data feeds, and the calculated data is efficiently and presented to a subscriber by the system in real time if a trigger is satisfied.

Embodiments of the present disclosure have been described that relate to interactive user interfaces for enabling non-technical users to quickly and dynamically create and report on sporting statistic triggers all in substantially real-time. In various embodiments the system may eliminate the need for a skilled programmer to generate a customized data and/or a report on a statistic trigger usage and effectiveness. Rather, the system may enable an end-user to customize, generate, and interact with complex data about statistic triggers in multiple contexts automatically. Accordingly, various embodiments of the present disclosure enable data generation and interaction in fewer steps (e.g. by downloading an analyzing sporting schedules in advance), to result in faster generation of sport statistic triggers, consume less processing and/or memory resources than previous technology, permit users to have less knowledge of programming languages and/or software development techniques, less knowledge of sporting events, and/or allow less technical users or developers to create triggers (such as tables and/or reports) than the available known methods and systems in the art. Thus, in some embodiments, the systems and user interfaces described herein may be more efficient as compared to previous systems and user interfaces.

While the foregoing is directed to various embodiments, other and further embodiments may be devised without departing from the basic scope thereof. For example, aspects of the present disclosure may be implemented in hardware or software or in a combination of hardware and software. An embodiment of the disclosure may be implemented as a program product for use with a computer system. The program(s) of the program product define functions of the embodiments (including the methods described herein) and may be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., hard-disk drive or any type of solid-state random-access semiconductor memory) on which alterable information is stored. Each of the processes, methods, and algorithms described in the preceding sections may be embodied in, and fully or partially automated by, code modules executed by one or more computer systems or computer processors comprising computer hardware. The processes and algorithms may alternatively be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

The term "shared memory" as used herein, is a broad term encompassing its plain an ordinary meaning and, as used in reference to types of memory (for example, shared memory on a single device for multiple processes, or distributed systems, over other types of networks/buses, including distributed shared memory and distributed global address space), includes without limitation a memory space or database that may be accessed by multiple processes on a single device or separate computing devices.

The term "trigger" as used herein, is a broad term encompassing its plain and ordinary meaning and, as used in reference herein, includes a definition of one or more required statistics, or set of statistics (out of a super set of statistics), for a team or player, that are required to be met. Such a trigger may include data or programmatic definition of the statistics to be met (specification of a team or player, and the type of statistic (winning or points) and the event(s) it may be applied to), and may have a configurable threshold for meeting the requirements (greater than 30 points, etc).

The term "broadcast message" as used herein, is a broad term encompassing its plain and ordinary meaning and, as used in reference herein, includes a text or graphical/video (or combination thereof) data that is to be delivered to a plurality of users, either via direct message to a device (e.g. mobile phone) or service associated with the user (e.g. email, facebook/twitter direct message), or delivered via a page associated with the sender of the message (twitter feed or facebook home page).

The term "queue" as used herein, is a broad term encompassing its plain and ordinary meaning and, as used in reference herein, includes a kind of data type or collection in which the entities in the collection are kept in order and operate in a first in-first out order. The term queue includes, for example, any data structure that provides entities such as data, objects, persons, or events to be stored and held to be processed later, usually in order. In these contexts, the queue performs the function of a buffer. A queue can be accessible by a single process, multiple processes and/or threads running on the same device, or multiple processes/threads running on multiple devices via an inter-device bus or network. A queue can be implemented using any type of data storage accessible by the devices that can access the queue, such as memory (including shared memories), magnetic disk, networkable/cloud storage, solid state disk, etc.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are among other acceptable examples. All such modifications and variations are intended to be included herein within the scope of this disclosure. The foregoing description details certain embodiments of the invention. It will be appreciated, however, that no matter how detailed the foregoing appears in text, the invention may be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computing system configured to access one or more electronic live sports data sources in response to inputs received via an interactive user interface in order to automatically filter events and trigger messages to a plurality of set recipients, the computing system comprising:
   a hardware computer processor;
   a shared memory accessible by the computer processor and accessible over a local area or wide area computer network by a second computer processor, the shared memory comprising:
      a first queue, the first queue configured to receive messages from a plurality of distinct match event detection processes for a plurality of sport types, the first queue accessible by a plurality of statistic trigger processes; and
      a second queue, the second queue configured to receive messages from the plurality of statistic trigger processes, and accessible by a plurality of delivery processes; and
   computer readable storage storing first instructions, second instructions, third instructions, and fourth instructions,
      the first instructions configured for execution by the computer processor in order to cause the computing system to:
         generate web user interface data for rendering the interactive user interface on a client computing device, the interactive user interface capable of receiving input, for:
            a sporting event associated with a time and location for the sporting event;
            a type of sport for the sporting event;
            a selection of a sports statistic generatable by one or more players at the sporting event; and a broadcast message, wherein the broadcast message is displayed within a test mobile user interface in the interactive user interface, the test mobile user interface configured to display a user inputted broadcast message in real-time in a sample text message within the test mobile user interface;

receive, from the client computing device, over an external network, the sporting event, the type of sport, the selection of the sports statistic, and the broadcast message;

create a configurable statistic trigger, based at least in part on the sporting event, the type of sport, and the selection of the sports statistic;

store the configurable statistic trigger in a data store accessible by the computing system; and store the broadcast message in the data store as associated with the configurable statistic trigger;

the second instructions configured for execution by the computer processor in order to cause the computing system to:

process a sport specific configuration, wherein the sport specific configuration is associated with the type of sport for the sporting event, the sport specific configuration file comprising:

a feed configuration, the feed configuration indicating one or more network locations to download real-time sport statistics for the type of sport for the sporting event;

a plurality of event configurations, each event configuration indicating the location of at least one type of statistic available in the feed related to the type of sport for the sporting event and one or more players or teams; and a plurality of trigger configurations, each trigger configuration indicating a statistic precondition associated with the type of sport for the sporting event, that may be used to satisfy a configurable statistic trigger;

download a live data feed from a network location of the one or more network locations;

parse the live data feed according to sport specific configuration;

detect changed data between the live data feed and a previous version of the live data feed;

based on the changed data, determine a live statistic change event for a team or player participating in the sporting event; and store the live statistic change event on the in the first queue in the shared memory;

the third instructions configured for execution by the computer processor in order to cause the computing system to:

retrieve the configurable statistic trigger from the data store;

access the first queue and retrieve the live statistic change event;

remove the live statistic change event from the first queue;

determine, based on at least the live statistic change event, whether the configurable statistic trigger has been satisfied; and in response to the determination that the configurable statistic trigger has been satisfied, store an indication message in the second queue in the shared memory to disseminate the broadcast message; and the fourth instructions configured for execution by the computer processor in order to cause the computing system to:

access the second queue and retrieve the indication message;

access the broadcast message from the data store or the indication message; and invoke an API to instruct a third computing system to send the broadcast message to a configurable group of recipients through one or more mobile networks, the third computing system accessible via local area or wide area computer network.

2. The system of claim 1, wherein the API instructs the third computing system to send the broadcast message via mobile text or SMS messaging.

3. The system of claim 2, wherein the configurable group of recipients comprises a listing of mobile telephone numbers, wherein each of the mobile telephone numbers subscribed to the receive the broadcast message via one or more text or SMS messages.

4. The system of claim 3, wherein the one or more text or SMS messages comprises a plurality of messages, wherein at least one of the plurality of messages comprises a confirmation of subscription.

5. The system of claim 4, wherein the third instructions configured for execution by the computer processor further cause the computing system to:

access the first queue and retrieve a second live statistic change event, the second live statistic change event indicating an end to the sporting event;

determine, in response to analyzing the second live statistic change event, that the configurable statistic trigger has not been satisfied; and in response to the determination that the configurable statistic trigger has not been satisfied, store a negative indication message in the second queue in the shared memory to disseminate a second broadcast message, wherein the second broadcast message is displayed within the test mobile user interface in the interactive user interface, the test mobile user interface configured to display a user inputted second broadcast message in real-time in a second sample text message within the test mobile user interface.

6. The system of claim 5, wherein the computer readable stores fifth instructions, the fifth instructions configured for execution by the computer processor in order to cause the computing system to periodically:

download from a second network location of the one or more network locations a second data feed; and parse the second data feed to extract a plurality of future sporting events, wherein the interactive user interface indicates that a future sporting event of the plurality of future sporting events is selectable within the interactive user interface for creating a second configurable statistic trigger.

7. The system of claim 6, wherein the interactive user interface provides a web based dashboard to track a plurality of configurable statistic triggers, the plurality of configurable statistic triggers comprising the configurable statistic trigger and the second configurable statistic trigger.

8. The system of claim 7, wherein the dashboard indicates a cost associated with disseminating the broadcast message.

9. The system of claim 1, wherein the configurable statistic trigger is satisfied when a selected team wins the sporting event.

10. The system of claim 1, wherein the configurable statistic trigger is satisfied when a sports statistic for a player in the sporting event reaches threshold amount.

11. A computerized method for disseminating a broadcast message, the method comprising:
by a computing device executing instructions on one or more hardware processors:
generating user interface data for rendering an interactive user interface on a client computing device, the interactive user interface capable of receiving input, for:
a sporting event associated with a time and location for the sporting event;
a type of sport for the sporting event;
a selection of a sports statistic generatable by one or more players at the sporting event; and
a broadcast message, wherein the broadcast message is displayed within a test mobile user interface in the interactive user interface, the test mobile user interface configured to display a user inputted broadcast message in real-time in a sample text message within the test mobile user interface;
receiving, from the client computing device, over an external network, the sporting event, the type of sport, the selection of the sports statistic, and the broadcast message;
creating a configurable statistic trigger, based at least in part on the sporting event, the type of sport, and the selection of the sports statistic;
storing the configurable statistic trigger in a data store accessible by the computing system;
storing the broadcast message in the data store as associated with the configurable statistic trigger;
processing a sport specific configuration, wherein the sport specific configuration is associated with the type of sport for the sporting event, the sport specific configuration file comprising:
a feed configuration, the feed configuration indicating one or more network locations to download real-time sport statistics for the type of sport for the sporting event;
a plurality of event configurations, each event configuration indicating the location of at least one type of statistic available in the feed related to the type of sport for the sporting event and one or more players or teams; and
a plurality of trigger configurations, each trigger configuration indicating a statistic precondition associated with the type of sport for the sporting event, that may be used to satisfy a configurable statistic trigger;
periodically:
downloading a live data feed from a network location of the one or more network locations;
parsing the live data feed according to sport specific configuration;
detecting changed data between the live data feed and a previous version of the live data feed;
based on the changed data, determining a live statistic change event for a team or player participating in the sporting event;
storing the live statistic change event on the in the first queue in a shared memory, the first queue configured to receive messages from a plurality of distinct match event detection processes for a plurality of sport types, the first queue accessible by a plurality of statistic trigger processes;
accessing the first queue and retrieving the live statistic change event;
removing the live statistic change event from the first queue;
determining, based on at least the live statistic change event, whether the configurable statistic trigger has been satisfied;
in response to determining that the configurable statistic trigger has been satisfied, storing an indication message a the second queue in the shared memory to disseminate the broadcast message, the second queue configured to receive messages from the plurality of statistic trigger processes, and accessible by a plurality of delivery processes;
accessing the second queue and retrieving the indication message;
accessing the broadcast message from the data store or the indication message; and
invoking an API to instruct a third computing system to send the broadcast message to a configurable group of recipients through one or more mobile networks, the third computing system accessible via local area or wide area computer network.

12. The method of claim 11, wherein the API instructs the third computing system to send the broadcast message via mobile text or SMS messaging.

13. The method of claim 12, wherein the configurable group of recipients comprises a listing of mobile telephone numbers, wherein each of the mobile telephone numbers subscribed to the receive the broadcast message via one or more text or SMS messages.

14. The method of claim 13, wherein the one or more text or SMS messages comprises a plurality of messages, wherein at least one of the plurality of messages comprises a confirmation of subscription.

15. The method of claim 14, further comprising, by the computing device executing instructions on one or more hardware processors:
accessing the first queue and retrieving a second live statistic change event, the second live statistic change event indicating an end to the sporting event;
determining, in response to analyzing the second live statistic change event, that the configurable statistic trigger has not been satisfied; and
in response to determining that the configurable statistic trigger has not been satisfied, storing a negative indication message in the second queue in the shared memory to disseminate a second broadcast message,
wherein the second broadcast message is displayed within the test mobile user interface in the interactive user interface, the test mobile user interface configured to display a user inputted second broadcast message in real-time in a second sample text message within the test mobile user interface.

16. The method of claim 15, further comprising, by the computing device executing instructions on one or more hardware processors, on a periodic basis:
downloading from a second network location of the one or more network locations a second data feed; and
parsing the second data feed to extract a plurality of future sporting events,
wherein the interactive user interface indicates that a future sporting event of the plurality of future sporting events is selectable within the interactive user interface for creating a second configurable statistic trigger.

17. The method of claim 6, wherein the interactive user interface provides a visual dashboard to track a plurality of configurable statistic triggers, the plurality of configurable statistic triggers comprising the configurable statistic trigger and the second configurable statistic trigger.

18. The system of claim 7, wherein the visual dashboard indicates a cost associated with disseminating the broadcast message.

19. The system of claim 1, wherein the configurable statistic trigger is satisfied when a selected team wins the sporting event.

20. The system of claim 1, wherein the configurable statistic trigger is satisfied when a sports statistic for a player in the sporting event reaches threshold amount.

* * * * *

UNITED STATES PATENT AND TRADEMARK OFFICE
CERTIFICATE OF CORRECTION

PATENT NO.       : 9,003,294 B1
APPLICATION NO.  : 14/582119
DATED            : April 7, 2015
INVENTOR(S)      : Craig Ames Page 1 of 6

It is certified that error appears in the above-identified patent and that said Letters Patent is hereby corrected as shown below:

On The Title Page,

Page 1 (item 57, Abstract) at line 4, Change "bashed" to --based--.

In The Drawings,

Sheet 2 of 37 (Fig. 2A) at line 1, Change "sport–" to --sport=--.

Sheet 2 of 37 (Fig. 2A) at line 1, Change "id–" to --id=--.

Sheet 2 of 37 (Fig. 2A) at line 3, Change "refresh–" to --refresh=--.

Sheet 2 of 37 (Fig. 2A) at line 18, Change "name–" to --name=--.

Sheet 2 of 37 (Fig. 2A) at line 18, Change "type–" to --type=--.

Sheet 2 of 37 (Fig. 2A) at line 18, Change "propagate–" to --propagate=--.

Sheet 2 of 37 (Fig. 2A) at line 22, Change "channel–" to --channel=--.

Sheet 2 of 37 (Fig. 2A) at line 37, Change "name–" to --name=--.

Sheet 2 of 37 (Fig. 2A) at line 37, Change "type–" to --type=--.

Sheet 2 of 37 (Fig 2A) at line 39, Change "name–" to --name=--.

Sheet 2 of 37 (Fig. 2A) at line 39, Change "type–" to --type=--.

Sheet 3 of 37 (Fig. 2B) at line 8, Change "name–" to --name=--.

Sheet 3 of 37 (Fig. 2B) at line 8, Change "type–" to --type=--.

Sheet 3 of 37 (Fig 2B) at line 10, Change "name–" to --name=--.

Sheet 3 of 37 (Fig 2B) at line 10, Change "type–" to --type=--.

Sheet 3 of 37 (Fig. 2B) at line 13, Change "name–" to --name=--.

Sheet 3 of 37 (Fig. 2B) at line 13, Change "type–" to --type=--.

Sheet 3 of 37 (Fig. 2B) at line 13, Change "value–" to --value=--.

Sheet 3 of 37 (Fig. 2B) at line 30, Change "name–" to --name=--.

Sheet 3 of 37 (Fig. 2B) at line 30, Change "src–" to --src=--.

Signed and Sealed this
Twelfth Day of July, 2016

Michelle K. Lee
*Director of the United States Patent and Trademark Office*

CERTIFICATE OF CORRECTION (continued)
U.S. Pat. No. 9,003,294 B1

Sheet 3 of 37 (Fig. 2B) at line 32, Change "channel–" to --channel=--.
Sheet 3 of 37 (Fig. 2B) at line 35, Change "name–" to --name=--.
Sheet 3 of 37 (Fig. 2B) at line 35, Change "type–" to --type=--.
Sheet 4 of 37 (Fig. 2C) at line 3, Change "name–" to --name=--.
Sheet 4 of 37 (Fig. 2C) at line 3, Change "type–" to --type=--.
Sheet 4 of 37 (Fig. 2C) at line 5, Change "name–" to --name=--.
Sheet 4 of 37 (Fig. 2C) at line 5, Change "type–" to --type=--.
Sheet 4 of 37 (Fig. 2C) at line 42, Change "string–" to --string=--.
Sheet 4 of 37 (Fig. 2C) at line 42, Change "value–" to --value=--.
Sheet 5 of 37 (Fig. 2D) at line 17, Change "name–" to --name=--.
Sheet 5 of 37 (Fig. 2D) at line 17, Change "output–" to --output=--.
Sheet 5 of 37 (Fig. 2D) at line 17, Change "format–" to --format=--.
Sheet 5 of 37 (Fig. 2D) at line 25, Change "name–" to --name=--.
Sheet 5 of 37 (Fig. 2D) at line 25, Change "type–" to --type=--.
Sheet 5 of 37 (Fig. 2D) at line 25, Change "value–" to --value=--.
Sheet 5 of 37 (Fig. 2D) at line 44, Change "condition" to --condition=--.
Sheet 6 of 37 (Fig. 2E) at line 3, Change "label–" to --label=--.
Sheet 6 of 37 (Fig. 2E) at line 22, Change "condition" to --condition=--.
Sheet 7 of 37 (Fig. 2F) at line 8, Change "name–" to --name=--.
Sheet 7 of 37 (Fig. 2F) at line 8, Change "type–" to --type=--.
Sheet 7 of 37 (Fig. 2F) at line 8, Change "propagate–" to --propagate=--.
Sheet 7 of 37 (Fig. 2F) at line 15, Change "name–" to --name=--.
Sheet 7 of 37 (Fig. 2F) at line 15, Change "type–" to --type=--.
Sheet 7 of 37 (Fig. 2F) at line 22, Change "string–" to --string=--.
Sheet 7 of 37 (Fig. 2F) at line 22, Change "value–" to --value=--.
Sheet 7 of 37 (Fig. 2F) at line 30, Change "name–" to --name=--.
Sheet 7 of 37 (Fig. 2F) at line 30, Change "type–" to --type=--.
Sheet 7 of 37 (Fig. 2F) at line 37, Change "name–" to --name=--.
Sheet 7 of 37 (Fig. 2F) at line 37, Change "output–" to --output=--.
Sheet 7 of 37 (Fig. 2F) at line 37, Change "format–" to --format=--.
Sheet 8 of 37 (Fig. 2G) at line 8, Change "name–" to --name=--.
Sheet 8 of 37 (Fig. 2G) at line 8, Change "type–" to --type=--.
Sheet 8 of 37 (Fig. 2G) at line 8, Change "value–" to --value=--.
Sheet 8 of 37 (Fig. 2G) at line 27, Change "name–" to --name=--.

Sheet 8 of 37 (Fig. 2G) at line 27, Change "value–" to --value=--.

Sheet 8 of 37 (Fig. 2G) at line 35, Change "name–" to --name=--.

Sheet 8 of 37 (Fig. 2G) at line 35, Change "type–" to --type=--.

Sheet 8 of 37 (Fig. 2G) at line 35, Change "value–" to --value=--.

Sheet 10 of 37 (Fig. 2I) at line 30, Change "url–" to --url=--.

Sheet 10 of 37 (Fig. 2I) at line 33, Change "url–" to --url=--.

Sheet 11 of 37 (Fig. 2J) at line 32 (approx.), Change "name–" to --name=--.

Sheet 11 of 37 (Fig. 2J) at line 32 (approx.), Change "type–" to --type=--.

Sheet 11 of 37 (Fig. 2J) at line 32 (approx.), Change "value–" to --value=--.

Sheet 12 of 37 (Fig. 3A) at line 13, Change "team–" to --team=--.

Sheet 12 of 37 (Fig. 3A) at line 13, Change "min–" to --min=--.

Sheet 12 of 37 (Fig. 3A) at line 13, Change "player–" to --player=--.

Sheet 13 of 37 (Fig. 3B) at line 15, Change "total–" to --total=--.

Sheet 13 of 37 (Fig. 3B) at line 17, Change "pass–" to --pass=--.

Sheet 13 of 37 (Fig. 3B) at line 20, Change "att–" to --att=--.

Sheet 13 of 37 (Fig. 3B) at line 37, Change "total–" to --total=--.

Sheet 13 of 37 (Fig. 3B) at line 37, Change "fumbles–" to --fumbles=--.

Sheet 14 of 37 (Fig. 3C) at line 3, Change "name–" to --name=--.

Sheet 14 of 37 (Fig. 3C) at line 3, Change "att–" to --att=--.

Sheet 14 of 37 (Fig. 3C) at line 3, Change "yards–" to --yards=--.

Sheet 14 of 37 (Fig. 3C) at line 13, Change "name–" to --name=--.

Sheet 14 of 37 (Fig. 3C) at line 13, Change "rushes–" to --rushes=--.

Sheet 14 of 37 (Fig. 3C) at line 37, Change "name–" to --name=--.

Sheet 14 of 37 (Fig. 3C) at line 37, Change "receptions–" to --receptions=--.

Sheet 15 of 37 (Fig. 3D) at line 1, Change "yards–" to --yards=--.

Sheet 15 of 37 (Fig. 3D) at line 1, Change "average–" to --average=--.

Sheet 15 of 37 (Fig. 3D) at line 1, Change "downs–" to --downs=--.

Sheet 15 of 37 (Fig. 3D) at line 9, Change "name–" to --name=--.

Sheet 15 of 37 (Fig. 3D) at line 9, Change "receptions–" to --receptions=--.

Sheet 15 of 37 (Fig. 3D) at line 11, Change "reception–" to --reception=--.

Sheet 15 of 37 (Fig. 3D) at line 11, Change "id–" to --id=--.

Sheet 15 of 37 (Fig. 3D) at line 19, Change "reception–" to --reception=--.

Sheet 15 of 37 (Fig. 3D) at line 19, Change "id–" to --id=--.

Sheet 15 of 37 (Fig. 3D) at line 28, Change "reception–" to --reception=--.

CERTIFICATE OF CORRECTION (continued)
U.S. Pat. No. 9,003,294 B1

Sheet 15 of 37 (Fig. 3D) at line 36, Change "yards–" to --yards=--.
Sheet 15 of 37 (Fig. 3D) at line 36, Change "average–" to --average=--.
Sheet 15 of 37 (Fig. 3D) at line 36, Change "downs–" to --downs=--.
Sheet 15 of 37 (Fig. 3D) at line 38, Change "name–" to --name=--.
Sheet 15 of 37 (Fig. 3D) at line 38, Change "receptions–" to --receptions=--.
Sheet 16 of 37 (Fig. 3E) at line 6, Change "name–" to --name=--.
Sheet 16 of 37 (Fig. 3E) at line 6, Change "total–" to --total=--.
Sheet 16 of 37 (Fig. 3E) at line 6, Change "lost–" to --lost=--.
Sheet 16 of 37 (Fig. 3E) at line 37, Change "downs–" to --downs=--.
Sheet 16 of 37 (Fig. 3E) at line 37, Change "id–" to --id=--.
Sheet 16 of 37 (Fig. 3E) at line 45, Change "downs–" to --downs=--.
Sheet 16 of 37 (Fig. 3E) at line 45, Change "id–" to --id=--.
Sheet 17 of 37 (Fig. 3F) at line 1, Change "tackles–" to --tackles=--.
Sheet 17 of 37 (Fig. 3F) at line 1, Change "sacks–" to --sacks=--.
Sheet 17 of 37 (Fig. 3F) at line 1, Change "tfl–" to --tfl=--.
Sheet 17 of 37 (Fig. 3F) at line 5, Change "tackles–" to --tackles=--.
Sheet 17 of 37 (Fig. 3F) at line 5, Change "sacks–" to --sacks=--.
Sheet 17 of 37 (Fig. 3F) at line 5, Change "tfl–" to --tfl=--.
Sheet 17 of 37 (Fig. 3F) at line 22, Change "defended–" to --defended=--.
Sheet 17 of 37 (Fig. 3F) at line 22, Change "hts–" to --hts=--.
Sheet 17 of 37 (Fig. 3F) at line 26, Change "defended–" to --defended =--.
Sheet 17 of 37 (Fig. 3F) at line 26, Change "hts–" to --hts=--.
Sheet 17 of 37 (Fig. 3F) at line 29, Change "tackles–" to --tackles=--.
Sheet 17 of 37 (Fig. 3F) at line 29, Change "sacks–" to --sacks=--.
Sheet 17 of 37 (Fig. 3F) at line 29, Change "tfl–" to --tfl=--.
Sheet 17 of 37 (Fig. 3F) at line 33, Change "tackles–" to --tackles=--.
Sheet 17 of 37 (Fig. 3F) at line 33, Change "sacks–" to --sacks=--.
Sheet 17 of 37 (Fig. 3F) at line 33, Change "tfl–" to --tfl=--.
Sheet 18 of 37 (Fig. 3G) at line 13, Change "tackles–" to --tackles=--.
Sheet 18 of 37 (Fig. 3G) at line 13, Change "sacks–" to --sacks=--.
Sheet 18 of 37 (Fig. 3G) at line 13, Change "tfl–" to --tfl=--.
Sheet 18 of 37 (Fig. 3G) at line 17, Change "tackles" to --tackles=--.
Sheet 18 of 37 (Fig. 3G) at line 17, Change "sacks" to --sacks=--.
Sheet 18 of 37 (Fig. 3G) at line 17, Change "tfl" to --tfl=--.

CERTIFICATE OF CORRECTION (continued)
U.S. Pat. No. 9,003,294 B1

Sheet 18 of 37 (Fig. 3G) at line 41, Change "sacks" to --sacks=--.
Sheet 18 of 37 (Fig. 3G) at line 41, Change "tfl" to --tfl=--.
Sheet 19 of 37 (Fig. 3H) at line 9, Change "downs–" to --downs=--.
Sheet 19 of 37 (Fig. 3H) at line 9, Change "id–" to --id=--.
Sheet 19 of 37 (Fig. 3H) at line 13, Change "downs–" to --downs=--.
Sheet 19 of 37 (Fig. 3H) at line 13, Change "id–" to --id=--.
Sheet 19 of 37 (Fig. 3H) at line 14, Change "name–" to --name=--.
Sheet 19 of 37 (Fig. 3H) at line 14, Change "tackles–" to --tackles=--.
Sheet 19 of 37 (Fig. 3H) at line 18, Change "name–" to --name=--.
Sheet 19 of 37 (Fig. 3H) at line 18, Change "tackles–" to --tackles=--.
Sheet 19 of 37 (Fig. 3H) at line 29, Change "downs–" to --downs=--.
Sheet 19 of 37 (Fig. 3H) at line 29, Change "id–" to --id=--.
Sheet 19 of 37 (Fig. 3H) at line 33, Change "downs–" to --downs=--.
Sheet 19 of 37 (Fig. 3H) at line 33, Change "id–" to --id=--.
Sheet 19 of 37 (Fig. 3H) at line 38, Change "name–" to --name=--.
Sheet 19 of 37 (Fig. 3H) at line 38, Change "tackles–" to --tackles=--.
Sheet 20 of 37 (Fig. 3I) at line 6, Change "name–" to --name=--.
Sheet 20 of 37 (Fig. 3I) at line 6, Change "total–" to --total=--.
Sheet 20 of 37 (Fig. 3I) at line 6, Change "yards–" to --yards=--.
Sheet 20 of 37 (Fig. 3I) at line 13, Change "average–" to --average=--.
Sheet 20 of 37 (Fig. 3I) at line 13, Change "lg–" to --lg=--.
Sheet 20 of 37 (Fig. 3I) at line 13, Change "td–" to --td=--.
Sheet 20 of 37 (Fig. 3I) at line 13, Change "id–" to --id=--.
In The Specification,
In column 3 at line 8, Change "on the in the" to --in the--.
In column 3 at line 47, Change "to the" to --to--.
In column 4 at lines 46-47, Change "on the in the" to --in the--.
In column 4 at line 57, Change "a" to --in--.
In column 5 at line 28, Change "to the" to --to--.
In column 22 at line 20, Change "to based" to --based--.
In column 28 at line 33, Change "20℃" to --20℃,--.
In column 28 at line 52, Change "25℃" to --25℃,--.
In The Claims,
In column 35 at line 50, In Claim 1, change "on the in the" to --in the--.

CERTIFICATE OF CORRECTION (continued)
U.S. Pat. No. 9,003,294 B1

In column 37 at line 62, In Claim 11, change "on the in the" to --in the--.

In column 38 at line 10, In Claim 11, change "a" to --in--.

In column 38 at line 30, In Claim 13, change "to the" to --to--.